United States Patent
Gao

(10) Patent No.: US 9,942,785 B2
(45) Date of Patent: Apr. 10, 2018

(54) METHOD, SYSTEM, AND DEVICE FOR TRANSMITTING PREAMBLE SIGNAL AND FOR SIGNAL MEASUREMENT

(71) Applicant: China Academy of Telecommunications Technology, Beijing (CN)

(72) Inventor: Qiubin Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 11 days.

(21) Appl. No.: 14/646,203

(22) PCT Filed: Nov. 13, 2013

(86) PCT No.: PCT/CN2013/086994
§ 371 (c)(1),
(2) Date: May 20, 2015

(87) PCT Pub. No.: WO2014/079329
PCT Pub. Date: May 30, 2014

(65) Prior Publication Data
US 2015/0289155 A1    Oct. 8, 2015

(30) Foreign Application Priority Data
Nov. 20, 2012    (CN) .......................... 2012 1 0476801

(51) Int. Cl.
*H04W 24/08* (2009.01)
*H04B 7/024* (2017.01)
(Continued)

(52) U.S. Cl.
CPC ............ *H04W 24/08* (2013.01); *H04B 7/024* (2013.01); *H04B 7/0413* (2013.01);
(Continued)

(58) Field of Classification Search
CPC .... H04B 7/024; H04B 7/0417; H04B 7/0632; H04B 7/0413; H04B 7/0626;
(Continued)

(56) References Cited

U.S. PATENT DOCUMENTS

| 2012/0176939 A1 | 7/2012 | Qu et al. |
| 2012/0208541 A1 | 8/2012 | Luo et al. |

(Continued)

FOREIGN PATENT DOCUMENTS

| CN | 102055508 | 5/2011 |
| CN | 102315871 | 1/2012 |

(Continued)

OTHER PUBLICATIONS

International Search Report for PCT/CN2013/086994 dated Jan. 23, 2014.

(Continued)

*Primary Examiner* — Raj Jain
(74) *Attorney, Agent, or Firm* — Foley & Lardner LLP

(57) ABSTRACT

A method, system, and device for transmitting a preamble signal and for signal measurement, for use in solving the problem found in the prior art that the transmission power of each antenna unit is greatly reduced as a result that each antenna unit transmits one preamble signal and that the complexity of a user equipment is increased when the antenna units are of a great number. The method of embodiments of the present disclosure comprises: a network side device transmits to the user equipment determined CSI feedback configurations, where one CSI feedback configuration corresponds to one CSI-RS resource, and the preamble signal corresponding to each port of the one CSI-RS resource is transmitted via one set of antenna unit corresponding to the port. Employment of the solution of the embodiments of the present disclosure increases the trans- (Continued)

mission power of the antenna units, allows the user equipment to correctly perform signal measurement, increases the performance of data transmission, and reduces the complexity of the user equipment when the antenna units are of a great number.

44 Claims, 8 Drawing Sheets

(51) Int. Cl.
*H04B 7/06* (2006.01)
*H04L 5/00* (2006.01)
*H04B 7/04* (2017.01)
*H04W 24/10* (2009.01)
*H04B 7/0413* (2017.01)
*H04L 25/02* (2006.01)
*H04B 7/0417* (2017.01)
*H04W 84/04* (2009.01)

(52) U.S. Cl.
CPC ......... *H04B 7/0469* (2013.01); *H04B 7/0626* (2013.01); *H04L 5/005* (2013.01); *H04L 5/0057* (2013.01); *H04L 25/0258* (2013.01); *H04W 24/10* (2013.01); *H04B 7/0417* (2013.01); *H04B 7/0632* (2013.01); *H04L 5/0023* (2013.01); *H04W 84/042* (2013.01)

(58) Field of Classification Search
CPC . H04L 25/0228; H04L 5/0057; H04L 5/0048; H04L 2025/03426; H04W 24/10; H04W 72/0413; H04W 72/042
See application file for complete search history.

(56) References Cited

U.S. PATENT DOCUMENTS

| | | | |
|---|---|---|---|
| 2012/0281567 A1 | 11/2012 | Gao et al. | |
| 2012/0287875 A1* | 11/2012 | Kim | H04W 76/046 370/329 |
| 2012/0322477 A1 | 12/2012 | Kang et al. | |
| 2013/0021926 A1* | 1/2013 | Geirhofer | H04L 5/0048 370/252 |
| 2013/0114425 A1* | 5/2013 | Sayana | H04B 7/024 370/252 |
| 2014/0226612 A1* | 8/2014 | Kim | H04B 7/024 370/329 |
| 2014/0321359 A1* | 10/2014 | Seo | H04L 5/0057 370/328 |
| 2015/0289155 A1* | 10/2015 | Gao | H04L 5/0057 370/252 |

FOREIGN PATENT DOCUMENTS

| | | |
|---|---|---|
| CN | 102546113 | 7/2012 |
| CN | 102754458 | 10/2012 |
| WO | WO 2008/138165 A1 | 11/2008 |
| WO | WO-2011/108880 A2 | 9/2011 |
| WO | WO-2012/150842 | 11/2012 |

OTHER PUBLICATIONS

Extended European Search Report for EP Patent Application No. 13856268.1 dated Nov. 19, 2015.

\* cited by examiner

Weight coefficient of the zero-th antenna element in each group of antenna elements Weight coefficient of the second data stream on the zero-th antenna element in the zero-th group $$W \otimes V = \begin{bmatrix} w(0)V \\ w(1)V \\ \vdots \\ w(P-1)V \end{bmatrix} \quad w(0)V = \begin{bmatrix} w(0)v(0,1) & w(0)v(0,2) & \cdots & w(0)v(0,R) \\ w(0)v(1,1) & w(0)v(1,2) & \cdots & w(0)v(1,R) \\ \vdots & \vdots & \ddots & \vdots \\ w(0)v(K-1,1) & w(0)v(K-1,2) & \cdots & w(0)v(K-1,R) \end{bmatrix}$$

Weight coefficient of the first data stream on the zero-th antenna element in the (K-1)-th group

Fig.9

Weight coefficients of the second data stream on the first group of antenna elements Weight coefficient of the second data stream on the first antenna element in the first group $$V \otimes W = \begin{bmatrix} v(0,1)W & v(0,2)W & \cdots & v(0,R)W \\ v(1,1)W & v(1,2)W & \cdots & v(1,R)W \\ \vdots & \vdots & \ddots & \vdots \\ v(K-1,1)W & v(K-1,2)W & \cdots & v(K-1,R)W \end{bmatrix} \rightarrow v(1,2)W = \begin{bmatrix} v(1,2)w(0) \\ v(1,2)w(1) \\ \vdots \\ v(1,2)w(P-1) \end{bmatrix}$$

Weight coefficients of the R-th data stream on the (K-1)-th group of antenna elements Weight coefficient of the second data stream on the (P-1)-th antenna element in the first group

Fig.10 they are integrated together with the antenna elements, so there is very low transmit power of each antenna element when there are a large number of antenna elements. If a pilot signal is transmitted over each antenna element as done in the prior art, then there may be so low transmit power that the user equipment might fail to achieve correct signal measurement, and the performance of data transmission.

2. If a pilot signal is transmitted over each antenna element, then there will be a such a large number of antenna ports, for each of which the user equipment has to make signal measurement and calculate Channel State Information (CSI) from a signal measurement value, that the complexity of the user equipment will be high when there are a large number of antenna elements.

In summary, as in the prior art, then there will be low transmit power of each antenna unit, and the complexity of the user equipment will be high when there are a large number of antenna elements.

METHOD, SYSTEM, AND DEVICE FOR TRANSMITTING PREAMBLE SIGNAL AND FOR SIGNAL MEASUREMENT

The present application is a US National Stage of International Application No. PCT/CN2013/086994, filed Nov. 13, 2013, designating the United States, and claiming the benefit of Chinese Patent Application No. 201210476801.6, filed with the Chinese Patent Office on Nov. 20, 2012 and entitled "Method, system and device for transmitting pilot signal and for signal measurement, which is hereby incorporated by reference in its entirety.

FIELD

The present disclosure relates to the field of wireless communications and particularly to a method, system and device for transmitting a pilot signal and for signal measurement.

BACKGROUND

Closed-loop pre-coding has been introduced in the Long Term Evolution (LTE) Release 8 (Rel-8) to improve the spectrum efficiency. Closed-loop pre-coding firstly requires the same group of pre-coding matrixes, referred to as a codebook, to be stored at both a network side device and a user equipment. The user equipment estimates channel information from a common pilot signal of a cell and then selects a pre-coding matrix from the codebook according to some criterion which can be the maximizing the mutual information, maximizing the output signal to interference and noise ratio, etc. The user equipment sends an index of the selected pre-coding matrix in the codebook to the network side device over an uplink channel, where the index is referred to as a Pre-coding Matrix Indicator (PMI). The network side device can determine from the value of the received index of the pre-coding matrix to be used for the user equipment. The pre-coding matrix reported by the user equipment can be considered as a quantized value of channel state information.

In an existing cellular system, an array of antennas of a network side device is typically arranged horizontally as illustrated in FIG. 1 and FIG. 2. A beam at a transmitter of the network side device can be adjusted only horizontally but the beam is transmitted with a common vertical down tilt value for each user equipment, so various beam-forming/pre-coding technologies are generally applied based upon horizontal channel information. In fact, since a radio signal propagates in three dimensions in space, the performance of the system may not be optimal with common vertical down tilt value. Vertical adjusting of the beam may be of great significance to the improved performance of the system. Along with the development of antenna technologies, an array of active antennas with each array element being separately controllable has emerged in the industry as illustrated in FIG. 3A and FIG. 3B. Vertical dynamic adjusting of a beam becomes possible with this array of antennas. 3D beam-forming/pre-coding may be performed in a Frequency Division Duplex (FDD) system based upon channel state information reported by a user equipment, possibly using a codebook as conventionally used in the LTE Rel-8 system.

However this report of the channel state information may suffer from the following problems:

1. An array of active antennas with each array element being separately controllable is applied for antenna elements in 3D beam-forming, and antenna power amplifiers are

SUMMARY

Embodiments of the disclosure provide a method, system and device for transmitting a pilot signal and for signal measurement so as to address the problems in the prior art that if a pilot signal is transmitted over each antenna unit, there will be low transmit power of each antenna unit, and the complexity of the user equipment will be high when there are a large number of antenna elements.

An embodiment of the disclosure provides a method for transmitting a pilot signal, the method including:

determining, by a network side device, at least one Channel State Information (CSI) feedback configuration to be transmitted to a user equipment, wherein one CSI feedback configuration corresponds to one Channel State Information-Reference Signal (CSI-RS) resource, and for each port of one CSI-RS resource, a pilot signal corresponding to the port is transmitted over one group of antenna elements corresponding to the port; and transmitting, by the network side device, the determined CSI feedback configuration to the user equipment to instruct the user equipment to receive a pilot signal over the CSI-RS resource corresponding to the CSI feedback configuration and to make signal measurement according to the received pilot signal.

An embodiment of the disclosure provides a method for signal measurement, the method including:

receiving, by a user equipment, a CSI feedback configuration configured by a network side device for the user equipment, wherein one CSI feedback configuration corresponds to one CSI-RS resource, and for each port of one CSI-RS resource, a pilot signal corresponding to the port is transmitted over one group of antenna elements corresponding to the port; and receiving, by the user equipment, a pilot signal over the CSI-RS resource corresponding to the CSI feedback configuration and making signal measurement according to the received pilot signal.

An embodiment of the disclosure provides a network side device for transmitting a pilot signal, the network side device including:

a processing module configured to determine at least one CSI feedback configuration to be transmitted to a user equipment, wherein one CSI feedback configuration corresponds to one CSI-RS resource, and for each port of one CSI-RS resource, a pilot signal corresponding to the port is transmitted over one group of antenna elements corresponding to the port; and a configuring module configured to transmit the determined CSI feedback configuration to the user equipment to instruct the user equipment to receive a pilot signal over the CSI-RS resource corresponding to the CSI feedback configuration and to make signal measurement according to the received pilot signal.

An embodiment of the disclosure provides a user equipment for signal measurement, the user equipment including:

a receiving module configured to receive a CSI feedback configuration configured by a network side device for the user equipment, wherein one CSI feedback configuration corresponds to one CSI-RS resource, and for each port of one CSI-RS resource, a pilot signal corresponding to the port is transmitted over one group of antenna elements corresponding to the port; and a measuring module configured to receive a pilot signal over the CSI-RS resource corresponding to the CSI feedback configuration and to make signal measurement according to the received pilot signal.

An embodiment of the disclosure provides a system for signal measurement, the system including:

a network side device configured to determine at least one CSI a feedback configuration to be transmitted to a user equipment, wherein one CSI feedback configuration corresponds to one CSI-RS resource, and for each port of one CSI-RS resource, a pilot signal corresponding to the port is transmitted over one group of antenna elements corresponding to the port, and to transmit the determined CSI feedback configuration to the user equipment to instruct the user equipment to receive a pilot signal over the CSI-RS resource corresponding to the CSI feedback configuration and to make signal measurement according to the received pilot signal; and the user equipment configured to receive the CSI feedback configuration configured by the network side device for the user equipment, to receive a pilot signal over the CSI-RS resource corresponding to the CSI feedback configuration, and to make signal measurement according to the receive pilot signal.

Another embodiment of the disclosure provides a network side device including a processor and a transceiver, wherein:

the processor is configured to determine at least one CSI feedback configuration to be transmitted to a user equipment, wherein one CSI feedback configuration corresponds to one CSI-RS resource, and for each port of one CSI-RS resource, a pilot signal corresponding to the port is transmitted over one group of antenna elements corresponding to the port; and the transceiver is configured to transmit the determined CSI feedback configuration to the user equipment to instruct the user equipment to receive a pilot signal over the CSI-RS resource corresponding to the CSI feedback configuration and to make signal measurement according to the received pilot signal.

Another embodiment of the disclosure provides a user equipment including:

a transceiver configured to receive a CSI feedback configuration transmitted by a network side device to the user equipment, wherein one CSI feedback configuration corresponds to one CSI-RS resource, and for each port of one CSI-RS resource, a pilot signal corresponding to the port is transmitted over one group of antenna elements corresponding to the port; and a processor configured to receive a pilot signal over the CSI-RS resource corresponding to the CSI feedback configuration and to make signal measurement according to the received pilot signal.

Since one CSI feedback configuration corresponds to one CSI-RS resource, and for each port of the CSI-RS resource, the pilot signal corresponding to the port over one group of antenna elements corresponding to the port, therefore avoiding that each antenna element transmit one pilot signal and thereby transmit power of the antenna element is improved, so that the user equipment can correctly make signal measurement for improved performance of data transmission. Furthermore the user equipment will not need to make signal measurement for each antenna port to thereby lower the complexity of the user equipment when there are a large number of antenna elements.

BRIEF DESCRIPTION OF THE DRAWINGS

In order to make the technical solutions according to the embodiments of the disclosure more apparent, the drawings to which reference will be made in the description of the embodiments will be described below briefly, and apparently the drawings described below are illustrative only some of the embodiments of the disclosure, and those ordinarily skilled in the art can further derive other drawings from these embodiments here without any inventive effort. In the drawings:

FIG. 9 illustrates a schematic diagram of $W \otimes V$ according to an embodiment of the disclosure;

FIG. 10 illustrates a schematic diagram of $V \otimes W$ according to an embodiment of the disclosure;

DETAILED DESCRIPTION OF THE EMBODIMENTS

In embodiments of the disclosure, a network side device transmits a determined CSI feedback configuration to a user equipment to instruct the user equipment to receive a pilot signal over a CSI-RS (Channel State Information-Reference Signal) resource corresponding to the CSI feedback configuration and to make signal measurement according to the received pilot signal, where one CSI feedback configuration corresponds to one CSI-RS resource, and for each port of the CSI-RS resource, the pilot signal corresponding to the port over one group of antenna elements corresponding to the port. Since one CSI feedback configuration corresponds to one CSI-RS resource, and for each port of the CSI-RS resource, the pilot signal corresponding to the port over one group of antenna elements corresponding to the port, each antenna element can be avoided from transmitting one pilot signal to thereby improve transmit power of the antenna element so that the user equipment can correctly make signal measurement for improved performance of data transmission. Furthermore the user equipment will not need to make signal measurement for each antenna port to thereby lower the complexity of the user equipment when there are a large number of antenna elements.

The embodiments of the disclosure will be described below in further details with reference to the drawings.

In the following description, firstly an implementation with cooperation of the network side and the user equipment side will be described, and then implementations at the network side and the user equipment side will be described respectively, but this will not suggest required cooperation of both the sides for an implementation, and in fact, problems encountered respectively at the network side and the user equipment side will also be addressed in the separate implementations at the network side and the user equipment side, although a better technical effect can be achieved in the implementation with cooperation of both the sides.

Figure 1:
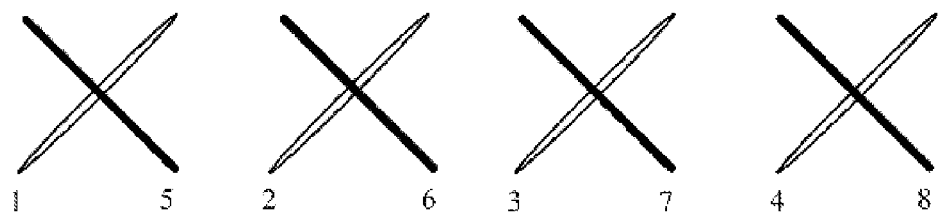
FIG. 1 illustrates a schematic diagram of horizontally arranged dually-polarized antennas in the prior art.
Figure 2:
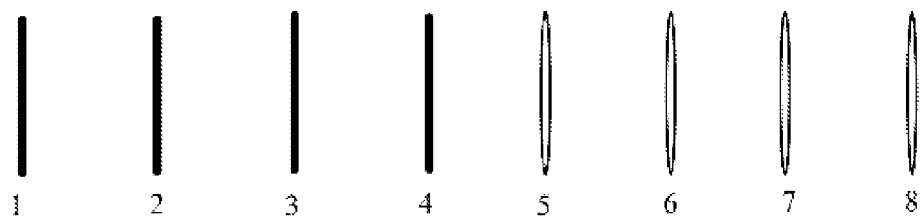
FIG. 2 illustrates a schematic diagram of horizontally arranged linearly-arrayed antennas in the prior art.
Figure 3A:
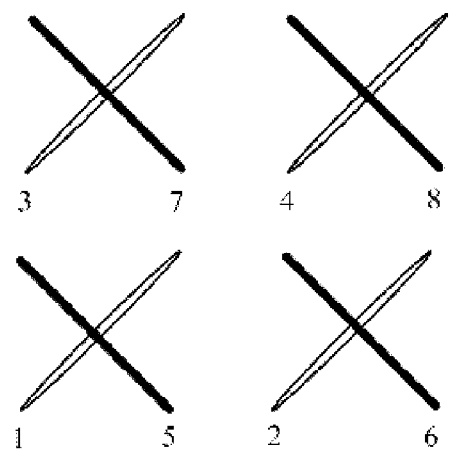
FIG. 3A illustrates a schematic diagram of horizontally 2D-arranged dually-polarized antennas in the prior art.
Figure 3B:
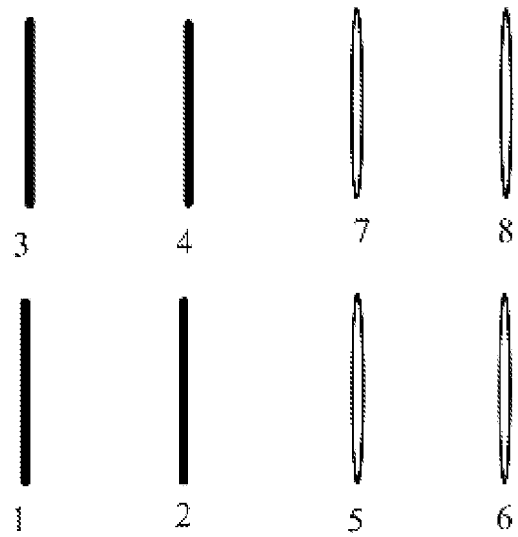
FIG. 3B illustrates a schematic diagram of vertically 2D-arranged linearly-arrayed antennas in the prior art.
Figure 4:
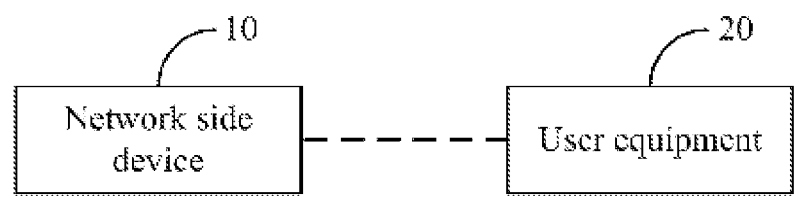
FIG. 4 illustrates a schematic structural diagram of a system for signal measurement according to an embodiment of the disclosure.

As illustrated in FIG. 4, a system for signal measurement according to an embodiment of the disclosure includes a network side device 10 and a user equipment 20.

The network side device 10 is configured to determine at least one CSI feedback configuration to be transmitted to the user equipment, where one CSI feedback configuration corresponds to one CSI-RS resource, and for each port of the CSI-RS resource, the pilot signal corresponding to the port over one group of antenna elements corresponding to the port, and to transmit the determined CSI feedback configuration to the user equipment 20; and The user equipment 20 is configured to receive the CSI feedback configuration configured by the network side device 10 for the user equipment 20, to receive a pilot signal over the CSI-RS resource corresponding to the CSI feedback configuration, and to make signal measurement according to the receive pilot signal.

In an implementation, the network side device groups a plurality of antenna elements of the network side device into K groups, each of which includes at least one antenna element. Here the numbers of antenna elements in the respective groups may be the same, partially the same or totally different.

There is such a relationship between a CSR-RS resource and a port that the CSR-RS resource includes a group of time-frequency resources over which a pilot signal of a CSI-RS of one or more ports is transmitted. A pilot signal of a port is transmitted over a part of the time-frequency (code) resources of the CSR-RS resource.

Figure 5:
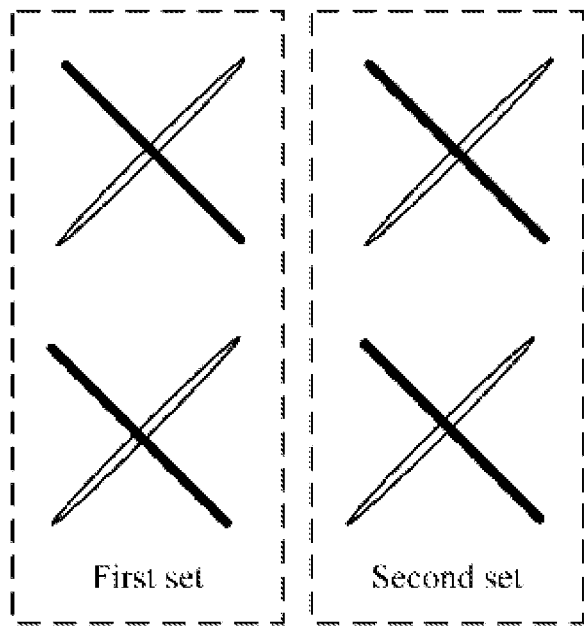
FIG. 5 illustrates a schematic diagram of each column of antenna elements grouped together according to an embodiment of the disclosure.
Figure 6:
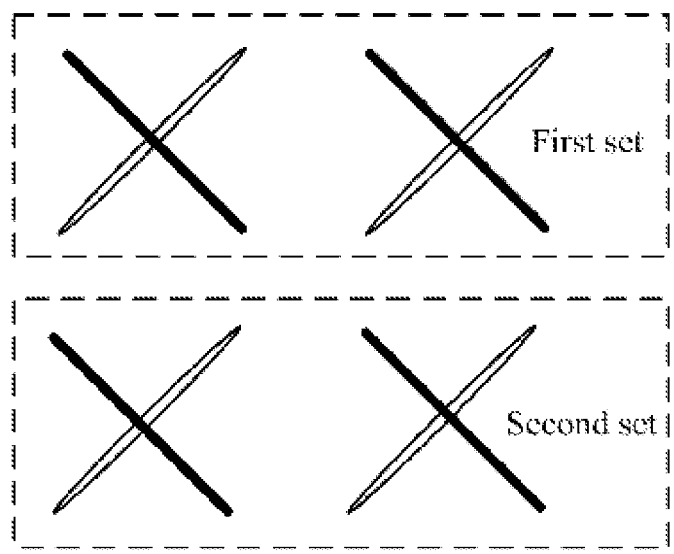
FIG. 6 illustrates a schematic diagram of each row of antenna elements grouped together according to an embodiment of the disclosure.

For example, for a horizontally and vertically 2D-arranged array of antennas, each column of antenna elements can be grouped together (particularly see FIG. 5) or each column of antenna elements can be grouped together (particularly see FIG. 6). For horizontally and vertically 2D-arranged dually-polarized antennas, antennas polarized in the same direction in a column of antenna elements can be grouped together, that is, a column of antenna elements can be grouped into two groups (particularly see FIG. 7).

Signal measurement can be made in two approaches according to the embodiment, which will be described below respectively.

In a first approach, the CSI-RS resource corresponding to the CSI feedback configuration determined by the network side device is selected from N CSI-RS resources, where N represents a positive integer.

Preferably the network side device determines M CSI feedback configurations, where M represents a positive integer, and M is no more than N. Here interference measurement resources of the CSI feedback configurations corresponding to the M CSI-RS resources are the same.

In an implementation, the network side device can firstly select the M CSI-RS resources from the N CSI-RS resources and then generates the corresponding CSI feedback configuration respectively for each of the selected CSI-RS resource.

For one CSI-RS resource, the network side device transmits the pilot signal corresponding to each port of the CSI-RS resource over one group of antenna elements corresponding to the port of the CSI-RS resource.

For one CSI-RS resource, the network side device determines an intra-group beam-forming weight vector corresponding to the CSI-RS resource; and for one port, the network side device weights the pilot signal corresponding to the port of the CSI-RS resource by the determined intra-group beam-forming weight vector and then transmits the pilot signal over one group of antenna elements corresponding to the port. Here the intra-group beam-forming weight vectors corresponding to the respective CSI-RS resources are totally different or partially the same.

In an implementation, the network side device can transmit the pilot signal corresponding to each port of the CSI-RS resource periodically, and transmit the CSI feedback configuration corresponding to the CSI-RS resource to the user equipment if necessary; or can firstly transmit the CSI feedback configuration corresponding to the CSI-RS resource to the user equipment and then transmit the pilot signal corresponding to each port of the CSI-RS resource periodically. That is, the CSI feedback configuration corresponding to the CSI-RS resource may not necessarily be transmitted to the user equipment before or after the pilot signal is transmitted thereto.

In the following description, the numbers of antenna elements in the respective groups will be the same by way of an example, but the same process will apply to the case when numbers of antenna elements are different or partially the same, so a repeated description thereof will be omitted here.

In the first approach, the network side device determines the N CSI-RS resources (or other pilot signals), each of which includes several specific time-frequency elements over which pilot signals of some number of antenna ports are transmitted.

The time-frequency elements of the CSI-RS resources can be determined by a sub-frame periodicity, a sub-frame offset, time-frequency locations occupied in a sub-frame and other parameters. For details about determination of time-frequency elements of a CSI-RS resource, reference can be made to the 3GPP TS 36.211 v10.5.0, so a repeated description thereof will be omitted here.

The number of ports of each of the CSI-RS resources is the same as the number of groups of antenna elements, and one port of each of the CSI-RS resources corresponds to one group of antenna elements, for example, the first port corresponds to the first group of antenna elements, the second port corresponds to the second group of antenna elements, and so on. The N CSI-RS resources can be configured with different sub-frame periodicities and offsets or configured with the same sub-frame periodicity and offset but at different locations in one sub-frame.

The network side device determines one intra-group beam-forming weight vector for each of the CSI-RS resources (respective elements of the vector are intra-group beam-forming weight values).

In an implementation, a correspondence relationship between the CSI-RS resource and the beam-forming weight vector can be pre-created, and the intra-group beam-forming weight vector corresponding to each of the CSI-RS resources can be determined according to the correspondence relationship. For example, if several beam need to be generated to cover the entire cell vertically, then each of the beams can correspond to one CSI-RS resource. Here the correspondence relationship can be preset for required coverage, a scenario, etc., and can be preset in a protocol or signaled in higher-layer signaling or decided by the network side device alone without notifying the user equipment.

Figure 8:
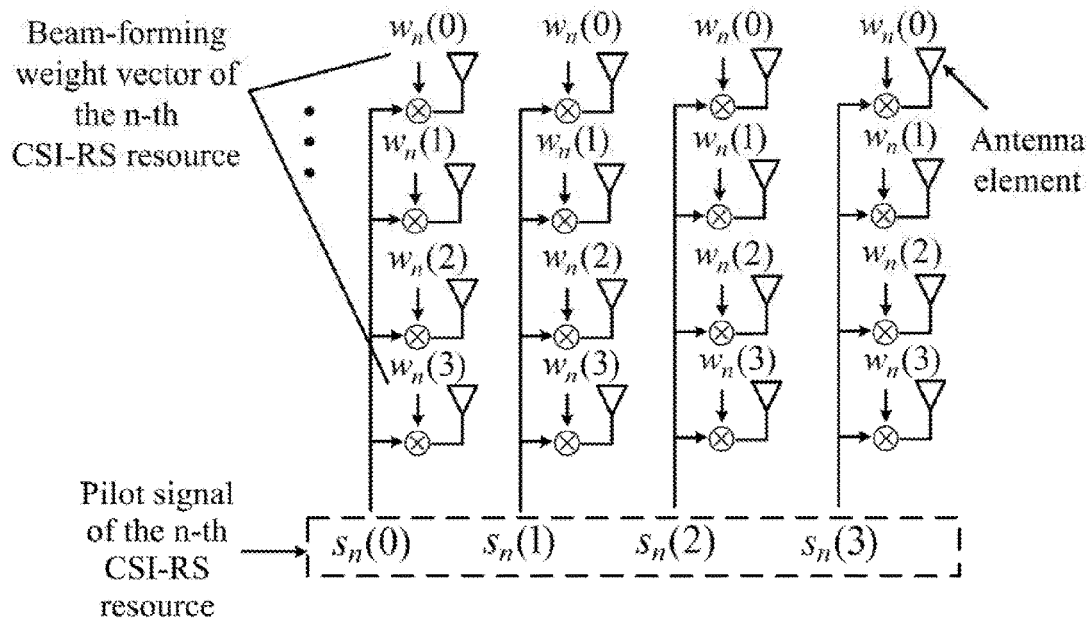
FIG. 8 illustrates a schematic diagram of transmitting a CSI-RS according to an embodiment of the disclosure.

For each port of the CSI-RS resource, the pilot signal thereof is weighted by the intra-group beam-forming weight vector and then transmitted over one group of antenna elements corresponding to the port. In FIG. 8, for example, there are 16 antenna elements in total, including four groups of four vertical antenna elements per group. A pilot signal of one port is transmitted over one of the groups of antenna elements. A pilot signal $s_n(i)$ of the i-th port is weighted by a beam-forming weight vector $[w_n(0)\ w_n(1)\ w_n(2)\ w_n(3)]^T$ and then transmitted over the i-th group of antenna elements, i.e., the i-th column of antenna elements. The CSI-RS resource is distinguished by the subscript n in the figure.

Preferably the intra-group beam-forming weight vectors of the N CSI-RS resources are different from each other so that the entire cell can be covered by the N CSI-RS resources, that is, the strength of the signal, over at least one of the CSI-RS resources, received by the UE at any location in the cell is satisfactory. For example the intra-group beam-forming weight vectors of the N CSI-RS resources are $\{W_0, W_1, \ldots, W_{N-1}\}$ with $W_n=[w_n(0)\ w_n(1)\ \ldots\ w_n(P-1)]^T$ respectively, where n=0, 1, . . . , N-1.

$W_n$ can be represented as a DFT vector, e.g., first P elements in the n-th column of an N-point DFT matrix, $$w_n(p) = e^{j2\pi \frac{np}{N}},$$

p=0, 1, . . . , P-1, n=0, 1, . . . , N-1 or $$w_n(p) = e^{-j2\pi \frac{np}{N}},$$

p=0, 1, . . . , P-1, n=0, 1, . . . , N-1. Alternatively $W_n$ can be represented as another beam-forming weight vector capable of good coverage.

The value of the number N of CSI-RS resources can be N=P, that is, the same as the number of antenna elements per group, or N=2P, N=4P or another value.

The network side device notifies the user equipment of the M CSI feedback configurations, each of which corresponds to one of the N CSI-RS resources, that is, M≤N.

Optionally each CSI feedback configuration corresponds to one interference measurement resource, and preferably the interference measurement resources of the M CSI feedback configurations are the same. The user equipment measures interference over the interference measurement resources.

In an implementation, the user equipment feeds back channel state information of all or a part of the CSI feedback configurations.

The user equipment estimates a channel, and calculates the Channel State Information (CSI), which can include but will not be limited to a part or all of an Rank Indication (RI), a Pre-coding Matrix Indicator (PMI) and a Channel Quality Indicator (CQI), of each of the CSI feedback configurations, over the CSI-RS resource (and the interference measurement resource) corresponding to each of the CSI feedback configurations, and feeds it back as configured by the network side device:

1. The user equipment feeds the channel state information of all the CSI feedback configurations back to the network side device; and 2. The user equipment selects according to some criterion and feeds back the channel state information of a part of the CSI feedback configurations. For example, the user equipment selects the CSI feedback configuration with the highest CQI for feedback or selects the CSI feedback configuration with the highest RI for feedback or selects the CSI feedback configuration with the highest throughput, to which the CQI is mapped, for feedback.

Preferably if the user equipment selects a part of the CSI feedback configurations for feedback, then the user equipment can feed identification information, of the CSI feedback configurations for feedback, back to the network side device.

In an implementation, the number of CSI feedback configurations for feedback can be notified by the network side to the user equipment or a prescribed fixed value. For example, if there is only one CSI feedback configuration for feedback, then the user equipment feeds back the channel state information corresponding to only one CSI feedback configuration which is optimum according to some criterion.

The network side device selects at least one of the at least one CSI feedback configuration transmitted to the user equipment according to a measurement parameter fed back by the user equipment and determines a parameter of data transmission for the user equipment according to the CSI reported by the user equipment for the selected CSI feedback configuration. Preferably the network side device selects the CSI feedback configuration corresponding to the highest CQI or the CSI feedback configuration with the highest throughput to which the CQI corresponding to the CSI feedback configuration is mapped.

In an implementation, in order to support multi-user transmission, the network side device can select the CSI feedback configuration for the user equipment by taking into account the CSI information of a plurality of paired user equipments, that is, select the CSI to be applied to data transmission for the paired user equipments jointly. That is, the network side device selects one CSI feedback configuration respectively for each of the paired user equipments to thereby maximize the sum of weighted throughputs of the paired user equipments.

In an implementation, the paired user equipments and the selected CSI feedback configuration can be optimized jointly.

For example, for possible combinations of the paired user equipments and the respective CSI feedback configurations of these user equipments (the CSI feedback configurations for which the corresponding CSI is reported by the user equipments), the sum of weighted throughputs of each of the combinations of paired user equipments is calculated, and the combination of paired user equipments with the highest sum of weighted throughputs, and the corresponding CSI feedback configurations are selected, so that the selected CSI feedback configurations may not be optimum for the single user equipments but will be optimum from the perspective of system performance.

In an implementation, the network side device determines a parameter of data transmission for the user equipment according to a measurement parameter fed back by the user equipment.

The network side device selects at least one of the at least one CSI feedback configuration transmitted to the user equipment according to the measurement parameter fed back by the user equipment and determines the parameter of data transmission for the user equipment according to the selected CSI feedback configuration.

The network side device determines the parameter of data transmission for the user equipment according to the intra-group beam-forming weight vector and a pre-coding matrix, wherein the intra-group beam-forming weight vector is corresponding to the CSI-RS resource corresponding to the selected CSI feedback configuration, and the pre-coding matrix is corresponding to a Pre-coding Matrix Indicator, PMI, fed back by the user equipment, corresponding to the selected CSI feedback configuration.

In an implementation, the network side device determines a transmission matrix $Z=V \otimes W$ or $Z=W \otimes V$, where $W=[w(0)\ w(1)\ \ldots\ w(P-1)]^T$ represents the intra-group beam-forming weight vector, P represents the number of antenna elements in a group of antenna elements, and V represents the pre-coding matrix corresponding to the PMI, fed back by the user equipment, corresponding to the selected CSI feedback configuration and includes the r-th column $v_r=[v(0,r), v(1,r), \ldots, v(K-1,r)]^T$, where K represents the number of ports of the CSI-RS resource corresponding to the selected CSI feedback configuration, and $\otimes$ represents a Kronecker product; and determines a weight coefficient matrix according to the transmission matrix.

With the transmission matrix of $Z=V \otimes W$, the network side device determines a weight coefficient of the r-th data stream on the h-th antenna element in the i-th group of antennas as $Y(P \cdot i+h,r)$; or With the transmission matrix of $Z=W \otimes V$, the network side device determines a weight coefficient of the r-th data stream on the h-th antenna element in the i-th group of antennas as $Y(i+h \cdot K,r)$.

The weight coefficient matrix can be determined according to the transmission matrix in the following two approaches:

In a first approach, the network side device determines the weight coefficient matrix as the transmission matrix, that is, $Y=Z$.

If the intra-group beam-forming weight vector of the CSI-RS resource corresponding to the selected CSI feedback configuration is represented as W, and the pre-coding matrix corresponding to the PMI, fed back by the user equipment, corresponding to the selected CSI feedback configuration is represented as V, then the network side device can transmit data using the pre-coding matrix $Z=W \otimes V$ or $Z=V \otimes W$, particularly as illustrated in FIG. 9 and FIG. 10.

Figure 11:
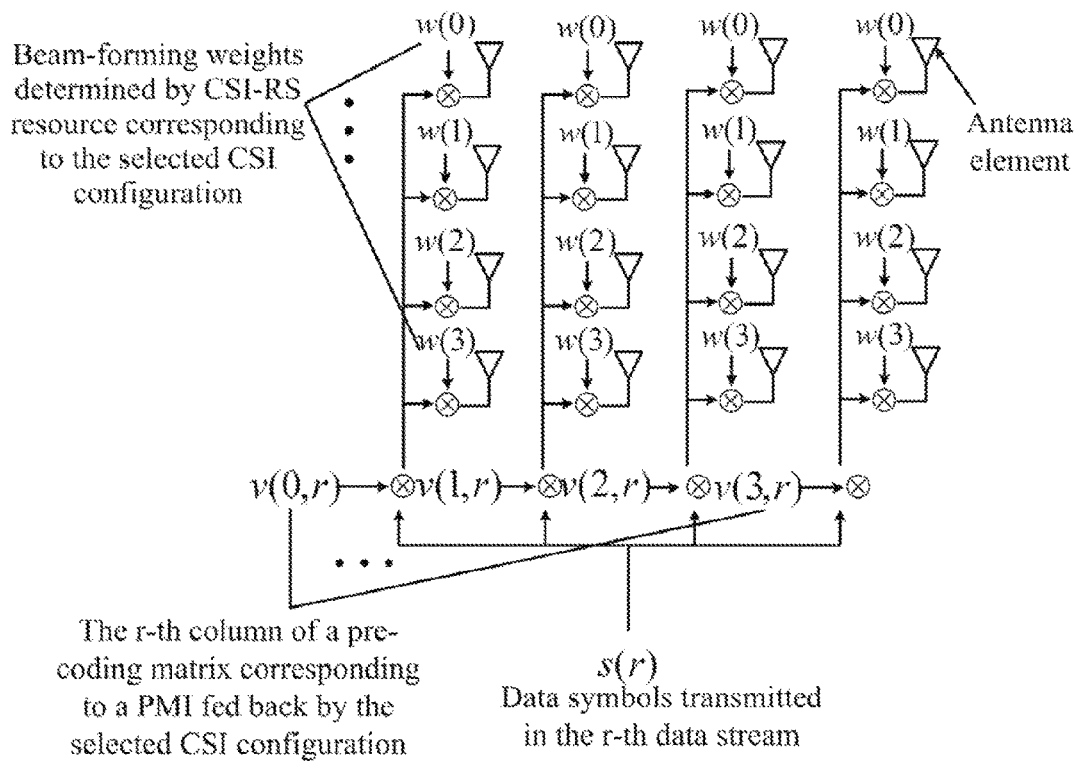
FIG. 11 illustrates a schematic diagram of processing the r-th data stream according to an embodiment of the disclosure.

For example, the pre-coding matrix fed back by the user equipment include K rows by R columns, that is, at most R data streams can be multiplexed spatially and transmitted concurrently, and includes the r-th column, denoted as $v_r=[v(0,r), v(1,r), \ldots, v(K-1,r)]^T$, for pre-coding (or beam-forming) of the r-th data stream, and each element of $V_r$ corresponds to a group of antenna elements according to a correspondence relationship between the group of antenna elements and the antenna port. If $v(i,r)$ corresponds to the i-th group of antenna elements, and the intra-group beam-forming weight vector of the h-th antenna element in the i-th group of antenna elements is represented as $w(h)$, then the weight coefficient of the r-th data stream on the antenna element is represented as $v(i,r) \times w(h)$. With K=4 and P=4, for example, reference can be made to FIG. 11 for the process above.

In a second transmission approach, the network side device zero-forces the transmission matrix and determines the weight coefficient matrix as the zero-forced transmission matrix.

For example, transmission matrixes of Q user equipments are represented as $Z_1, Z_2, \ldots, Z_Q$ respectively, and a weight coefficient matrix of the q-th user equipment is determined as $Y=([Z_1\ Z_2\ \ldots\ Z_Q][Z_1\ Z_2\ \ldots\ Z_Q]^H+\alpha I)^{-1}Z_q$ as a result of zero-forcing, where I represents a unity matrix, and $\alpha$ represents an algorithm parameter. Then data is transmitted with the user equipment using the calculated weight coefficient matrix.

Preferably in order to lower the complexity of processing by the network side device, the network side device can zero-force only the intra-group beam-forming weight vector of the user equipment.

For example, the intra-group beam-forming weight vectors corresponding to the CSI feedback configurations selected for the Q user equipments are represented as $W_1, W_2, \ldots, W_Q$ respectively, and the weight coefficient matrix of the q-th user equipment is determined as $([W_1\ W_2\ w_Q][W_1\ w_2\ \ldots\ w_Q]^H+\alpha I)^{-1}W_q$ as a result of zero-forcing, where I represents a unity matrix, and $\alpha$ represents an algorithm parameter. Then data is transmitted with the user equipment using the newly calculated intra-group beam-forming weight vector instead of the intra-group beam-forming weight vector, particularly in the same process as in the first transmission approach, so a repeated description thereof will be omitted here.

In an implementation, the network side device can determine the parameter of data transmission according to the CSI of the respective CSI feedback configurations fed back by the UE. For example, the network side device selects one or more of the CSI of the respective CSI feedback configurations fed back by the UE and determines the parameter of data transmission according to the selected CSI. The parameter of data transmission can be determined according to the selected CSI in the same process as above, so a repeated description thereof will be omitted here. The network side device can select one or more of the CSI of the respective CSI feedback configurations fed back by the UE in a number of implementations, for example, the network side device selects the CSI corresponding to the highest CQI or the CSI with the highest throughput to which the CQI corresponding to the CSI feedback configuration is mapped, or the network side device selects the CSI corresponding to the highest RI, or the network side device selects the CSI with the PMI belonging to a specific set.

In a second approach, the CSI-RS resource is selected for the user equipment according to a measurement parameter fed back by the user equipment.

Firstly the network side device transmits a first CSI feedback configuration corresponding to a first CSI-RS resource to the user equipment to instruct the user equipment to receive a pilot signal over the first CSI-RS resource corresponding to the first CSI feedback configuration and to make signal measurement according to the received pilot signal.

For one first CSI-RS resource, the network side device transmits a pilot signal corresponding to each port of the first CSI-RS resource over one group of antenna elements corresponding to the port of the first CSI-RS resource.

For one first CSI-RS resource, the network side device determines an intra-group beam-forming weight vector corresponding to the first CSI-RS resource; and for one port, the network side device weights the pilot signal corresponding to the port of the first CSI-RS resource by the determined intra-group beam-forming weight vector and then transmits the pilot signal over one group of antenna elements corresponding to the port.

In an implementation, the network side device can transmit the pilot signal corresponding to each port of the first CSI-RS resource periodically, and transmit the first CSI feedback configuration corresponding to the first CSI-RS resource to the user equipment if necessary; or can firstly transmit the first CSI feedback configuration corresponding to the first CSI-RS resource to the user equipment and then transmit the pilot signal corresponding to each port of the first CSI-RS resource periodically. That is, the first CSI feedback configuration corresponding to the first CSI-RS resource may not necessarily be transmitted to the user equipment before or after the pilot signal is transmitted thereto.

Then the network side device determines a measurement parameter of the user equipment for the pilot signal of at least one first CSI-RS resource; selects a part or all of first CSI-RS resources from all first CSI-RS resources according to the determined measurement parameters; determines at least one second CSI-RS resource corresponding to the selected a part or all of first CSI-RS resources; and determines a second CSI feedback configuration as the CSI feedback configuration to be transmitted to the user equipment, where a CSI-RS resource corresponding to the second CSI feedback configuration is the determined second CSI-RS resource.

Preferably the intra-group beam-forming weight vector of the first CSI-RS resource is the same as an intra-group beam-forming weight vector of the corresponding second CSI-RS resource.

Preferably the network side device determines the first CSI-RS resources corresponding to the first X highest measurement parameters or determines the first CSI-RS resources corresponding to X measurement parameters greater than a threshold, where X represents a positive integer.

If the number of measurement parameters above the threshold is less than X, then the network side device obtains the first CSI-RS resources with the corresponding measurement parameters more than the threshold.

For one second CSI-RS resource, the network side device transmits a pilot signal corresponding to each port of the second CSI-RS resource over one group of antenna elements corresponding to the port of the second CSI-RS resource.

For one second CSI-RS resource, the network side device determines an intra-group beam-forming weight vector corresponding to the second CSI-RS resource; and for one port, the network side device weights the pilot signal corresponding to the port of the second CSI-RS resource by the determined intra-group beam-forming weight vector and then transmits the pilot signal over one group of antenna elements corresponding to the port.

In an implementation, the network side device can transmit the pilot signal corresponding to each port of the second CSI-RS resource periodically, and transmit the second CSI feedback configuration corresponding to the second CSI-RS resource to the user equipment if necessary; or can firstly transmit the second CSI feedback configuration corresponding to the second CSI-RS resource to the user equipment and then transmit the pilot signal corresponding to each port of the second CSI-RS resource periodically. That is, the second CSI feedback configuration corresponding to the second CSI-RS resource may not necessarily be transmitted to the user equipment before or after the pilot signal is transmitted thereto.

In an implementation, the network side device can concurrently transmit the pilot signal corresponding to each port of the first CSI-RS resource periodically and transmit the pilot signal corresponding to each port of the second CSI-RS resource periodically; or can firstly transmit the pilot signal corresponding to each port of the first CSI-RS resource periodically and then transmit the pilot signal corresponding to each port of the second CSI-RS resource periodically.

In the following description, the numbers of antenna elements in the respective groups will be the same by way of an example, but the same process will apply to the numbers of antenna elements which are different or partially the same, so a repeated description thereof will be omitted here.

In the second approach, in an implementation, the user equipment feeds back channel state information of all or a part of the CSI feedback configurations.

The network side device determines a plurality of first CSI-RS resources (or other pilot signals), each of which includes several specific time-frequency elements over which pilot signals of some number of antenna ports are transmitted.

The time-frequency elements of the first CSI-RS resources can be determined by a sub-frame periodicity, a sub-frame offset, time-frequency locations occupied in a sub-frame and other parameters. For details about determination of time-frequency elements of a first CSI-RS resource, reference can be made to the 3GPP TS 36.211 v10.5.0, so a repeated description thereof will be omitted here.

The number of ports of each of the first CSI-RS resources may be less than or the same as the number of groups of antenna elements, and one port of each of the first CSI-RS resources corresponds to one group of antenna elements, for example, the first port corresponds to the first group of antenna elements, the second port corresponds to the second group of antenna elements, and so on. The N first CSI-RS resources can be configured with different sub-frame periodicities and offsets or configured with the same sub-frame periodicity and offset but at different locations in one sub-frame.

Preferably in order to lower an overhead of a pilot signal, the first CSI-RS resource can be configured with only one port, and a pilot signal of the port can be transmitted over one group of antenna elements.

An intra-group beam-forming weight vector is determined for each of the first CSI-RS resources (respective elements of the vector are intra-group beam-forming weight values), and for each port of the first CSI-RS resource, the pilot signal thereof is weighted by the intra-group beam-forming weight vector and then transmitted over one group of antenna elements corresponding to the port. In FIG. 8, for example, there are 16 antenna elements in total, including four groups of four vertical antenna elements per group. A pilot signal of one port is transmitted over each of the groups of antenna elements. A pilot signal $s_n(i)$ of the i-th port is weighted by a beam-forming weight vector $[w_n(0)\ w_n(1)\ w_n(2)\ w_n(3)]^T$ and then transmitted over the i-th group of antenna elements, i.e., the i-th column of antenna elements. The first CSI-RS resource is distinguished by the subscript n in the figure.

Preferably the intra-group beam-forming weight vectors of the N first CSI-RS resources are different from each other so that the entire cell can be covered by the N first CSI-RS resources, that is, the strength of the signal, over at least one of the first CSI-RS resources, received by the UE at any location in the cell is satisfactory. For example the intra-group beam-forming weight vectors of the N first CSI-RS resources are $\{W_0, W_1, \ldots, W_{N-1}\}$ with $W_n = [w_n(0)\ w_n(1) \ldots w_n(P-1)]^T$ respectively, where n=0, 1, . . . , N−1.

$W_n$ can be represented as a Discrete Fourier Transform (DFT) vector, e.g., first P elements in the n-th column of an N-point DFT matrix, $$w_n(p) = e^{j2\pi \frac{np}{N}},$$

p=0, 1, . . . , P−1, n=0, 1, . . . , N−1 or $$w_n(p) = e^{-j2\pi \frac{np}{N}},$$

p=0, 1, . . . , P−1, n=0, 1, . . . , N−1 Alternatively $W_n$ can be represented as another beam-forming weight vector capable of good coverage.

The value of the number N of first CSI-RS resources can be N=P, that is, the same as the number of antenna elements per group, or N=2P, N=4P or another value.

The network side device notifies the user equipment of configuration information of the N first CSI-RS resources, including a periodicity, an offset, time-frequency locations in a sub-frame, transmit power, the number of antenna ports and other configuration information.

In an implementation, the user equipment calculates Reference Signal Received Power (RSRP) according to the received pilot signal.

The user equipment estimates a channel, and calculates the RSRP, according to the configuration information of each of the first CSI-RS resources, and the pilot signal received by the user equipment, and feeds it back as configured by the network side device.

The user equipment receives the first CSI feedback configuration transmitted by the network side device to the user equipment; and The user equipment receives the pilot signal over the CSI-RS resource corresponding to the first CSI feedback configuration and makes signal measurement according to the received pilot signal.

In an implementation, the user equipment determines the RSRP over the first CSI-RS resource corresponding to each of the first CSI feedback configurations and feeds the determined RSRP back to the network side device.

The user equipment determines the RSRP of all or a part of the ports of the first CSI-RS resources corresponding to all or a part of the first CSI feedback configurations and averages the determined RSRP.

For example, the user equipment estimates channels of all the ports of each of the first CSI-RS resources and averages pilot signal received power values of all the ports of a CSI-RS resource, or The user equipment estimates channels of only a part of the ports of each of the first CSI-RS resources and averages pilot signal received power values of these ports of a CSI-RS resource, for example, the user equipment estimates a channel of only the first port of each of the first CSI-RS resources and calculates a pilot signal received power value of the pilot signal.

In an implementation, the user equipment can further average the determined RSRP in a preset time range and/or in a preset frequency range, e.g., over the entire bandwidth and/or over 200 sub-frames.

Preferably the user equipment can feed the determined RSRP periodically back to the network side device; or feed the determined RSRP back to the network side device after a feedback event is triggered.

For example, the user equipment can trigger the feedback upon determining that the RSRP of one of the first CSI-RS resources is more than some threshold.

The network side device receives the RSRP of the first CSI feedback configurations fed back by the user equipment and selects a beam.

The network side device selects M CSI feedback configuration, for example, with the highest RSRP among all the first CSI feedback configurations, where M represents a preset value; or selects first CSI feedback configurations with the RSRP higher than some threshold, where the number of samples of RSRP more than the threshold is M.

The network side device determines M second CSI-RS resources (or other pilot signals) corresponding to the M first CSI-RS resources.

Each of the second CSI-RS resources corresponds to one of the first CSI-RS resources. The second CSI-RS resource may be the same as some one of the first CSI-RS resources or may be different from any one of the first CSI-RS resources, so the first CSI-RS resources corresponding to the second CSI-RS resources can be preset as needed or through simulation and specified in a protocol or signaled by a higher layer or decided by the network side device alone without notifying to the user equipment.

Each of the second CSI-RS resources includes several specific time-frequency elements over which pilot signals of some number of antenna ports are transmitted. The time-frequency elements of the second CSI-RS resources can be determined by a sub-frame periodicity, a sub-frame offset, time-frequency locations occupied in a sub-frame and other parameters.

The number of ports of each of the second CSI-RS resources is the same as the number of groups of antenna elements, and one port of each of the second CSI-RS resources corresponds to one group of antenna elements, for example, the first port corresponds to the first group of antenna elements, the second port corresponds to the second group of antenna elements, and so on. The M second CSI-RS resources can be configured with different sub-frame periodicities and offsets or configured with the same sub-frame periodicity and offset but at different locations in one sub-frame.

An intra-group beam-forming weight vector is determined for each of the second CSI-RS resources (respective elements of the vector are intra-group beam-forming weight values), and for each port of the second CSI-RS resource, the pilot signal thereof is weighted by the intra-group beam-forming weight vector and then transmitted over one group of antenna elements corresponding to the port in the same process as the process in FIG. 8.

The intra-group beam-forming weight vector of each of the second CSI-RS resources is derived from the intra-group beam-forming weight vector of the corresponding first CSI-RS resource, for example, determined directly as the intra-group beam-forming weight vector of the corresponding first CSI-RS resource.

The network side device notifies the user equipment of configuration information of the M second CSI-RS resources, including a periodicity, an offset, time-frequency locations in a sub-frame, transmit power, the number of antenna ports and other configuration information.

Correspondingly the user equipment determines the second CSI-RS resources according to the second CSI feedback configurations configured by the network side for the user equipment and measures and feeds back channel state information over the determined second CSI-RS resources.

In an implementation, the user equipment can measure and feed back channel state information over the determined second CSI-RS resources in the same approach as the first approach in which the user equipment makes measurement and feedback or in the process in the 3GPP TS 36.211 v10.5.0.

In the second approach, the user equipment can select one of the at least one second CSI-RS resource transmitted to the user equipment according to a measurement parameter fed back by the user equipment and transmit data with the user equipment according to the selected second CSI feedback configuration particularly as in the first approach, so a repeated description thereof will be omitted here. Of course, the network side device can alternatively proceed as in the prior art or otherwise upon reception of the measurement parameter fed back by the user equipment.

In an implementation, all the second CSI-RS resources in the second approach can be the N CSI-RS resources in the first approach.

The network side device according to the embodiment of the disclosure can be a Node B (e.g., a macro Node B, a home Node B, etc.) or can be a Relay Node (RN) device or can be another network side device.

Figure 12:
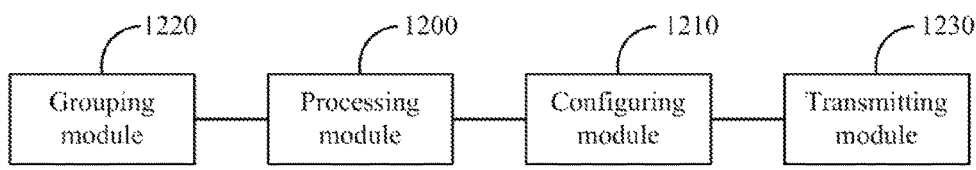
FIG. 12 illustrates a schematic structural diagram of a network side device in a system for signal measurement according to an embodiment of the disclosure.

As illustrated in FIG. 12, a network side device in a system for signal measurement according to an embodiment of the disclosure includes a processing module 1200 and a configuring module 1210.

The processing module 1200 is configured to determine at least one CSI feedback configuration to be transmitted to a user equipment, where one CSI feedback configuration corresponds to one CSI-RS resource, and for each port of the CSI-RS resource, the pilot signal corresponding to the port over one group of antenna elements corresponding to the port; and The configuring module 1210 is configured to transmit the determined CSI feedback configuration to the user equipment to instruct the user equipment to receive a pilot signal over the CSI-RS resource corresponding to the CSI feedback configuration and to make signal measurement according to the received pilot signal.

Preferably M CSI-RS resources corresponding to CSI feedback configurations determined by the processing module 1200 are selected from N CSI-RS resources.

Preferably the configuring module 1212 transmits, for one CSI-RS resource, the pilot signal corresponding to each port of the CSI-RS resource over one group of antenna elements corresponding to each port of the CSI-RS resource.

Preferably the processing module 1200 determines, for one CSI-RS resource, an intra-group beam-forming weight vector corresponding to the CSI-RS resource; and weights, for one port, the pilot signal corresponding to the port of the CSI-RS resource by the determined intra-group beam-forming weight vector and then transmits the pilot signal over one group of antenna elements corresponding to the port.

Preferably the processing module 1200 determines a measurement parameter of the user equipment for the pilot signal of at least one first CSI-RS resource; selects a part or all of first CSI-RS resource from all the first CSI-RS resources according to the determined measurement parameters; and determines a second CSI feedback configuration of a second CSI-RS resource corresponding to the selected a part or all of first CSI-RS resource as the CSI feedback configuration to be transmitted to the user equipment.

Preferably the processing module 1200 determines the first CSI-RS resources corresponding to the first X highest measurement parameters or determines the first CSI-RS resources corresponding to X measurement parameters greater than a threshold, where X represents a positive integer.

Preferably the processing module 1200 transmits the first CSI feedback configuration corresponding to the first CSI-RS resource to the user equipment to instruct the user equipment to receive a pilot signal over the first CSI-RS resource corresponding to the first CSI feedback configuration and to make signal measurement according to the received pilot signal.

Preferably the processing module 1200 transmits, for one first CSI-RS resource, a pilot signal corresponding to each port of the first CSI-RS resource over one group of antenna elements corresponding to the port of the first CSI-RS resource.

Preferably the processing module 1200 determines, for one first CSI-RS resource, an intra-group beam-forming weight vector corresponding to the first CSI-RS resource; and weights, for one port, the pilot signal corresponding to the port of the first CSI-RS resource by the determined intra-group beam-forming weight vector and then transmits the pilot signal over one group of antenna elements corresponding to the port.

Preferably the processing module 1200 transmits, for one second CSI-RS resource, a pilot signal corresponding to each port of the second CSI-RS resource over one group of antenna elements corresponding to the port of the second CSI-RS resource.

Preferably the configuring module 1210 determines, for one second CSI-RS resource, an intra-group beam-forming weight vector corresponding to the second CSI-RS resource; and weights the pilot signal corresponding to each port of the second CSI-RS resource by the determined intra-group beam-forming weight vector and then transmits the pilot signal over one group of antenna elements corresponding to the port.

Preferably the network side device according to the embodiment of the disclosure can further include a grouping module 1220.

The grouping module 1220 is configured to group a plurality of antenna elements into a plurality of groups, each of which includes at least one antenna element.

Preferably the grouping module 1220 groups each column of antenna elements together; or groups each row of antenna elements together; or groups antenna elements polarized in the same direction in a column of antenna elements.

Preferably the network side device according to the embodiment of the disclosure can further include a transmitting module 1230.

Preferably the transmitting module 1230 is configured to determine a parameter of data transmission with the user equipment according to a measurement parameter fed back by the user equipment.

Preferably the transmitting module 1230 selects at least one of the at least one CSI feedback configuration transmitted to the user equipment according to the measurement parameter fed back by the user equipment and determines the parameter of data transmission with the user equipment according to the selected CSI feedback configuration.

Preferably the transmitting module 1230 selects the CSI feedback configuration corresponding to the highest CQI or the CSI feedback configuration with the highest throughput to which the CQI corresponding to the CSI feedback configuration is mapped; or selects one CSI feedback configuration respectively for each of paired user equipments to thereby maximum the sum of weighted throughputs of the paired user equipments.

Preferably the transmitting module 1230 determines the parameter of data transmission with the user equipment according to the intra-group beam-forming weight vector and a pre-coding matrix, wherein the intra-group beam-forming weight vector is corresponding to the CSI-RS resource corresponding to the selected CSI feedback configuration, and the pre-coding matrix is corresponding to a Pre-coding Matrix Indicator, PMI, fed back by the user equipment, corresponding to the selected CSI feedback configuration.

Preferably the transmitting module 1230 determines a transmission matrix $Z=V \otimes W$ or $Z=W \otimes V$, where $W=[w(0) \ w(1) \ldots w(P-1)]^T$ represents the intra-group beam-forming weight vector, and V represents the pre-coding matrix corresponding to the PMI, fed back by the user equipment, corresponding to the selected CSI feedback configuration and includes the r-th column $V_r=[v(0,r), v(1,r), \ldots, v(K-1,r)]^T$; and determines a weight coefficient matrix according to the transmission matrix.

Preferably the transmitting module 1230 determines the weight coefficient matrix as the transmission matrix; or zero-forces the transmission matrix and determines the weight coefficient matrix as the zero-forced transmission matrix.

Figure 13:
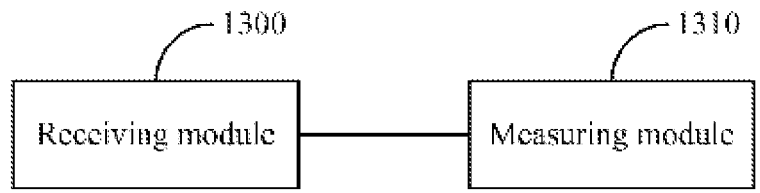
FIG. 13 illustrates a schematic structural diagram of a user equipment in a system for signal measurement according to an embodiment of the disclosure.

As illustrated in FIG. 13, a user equipment in a system for signal measurement according to an embodiment of the disclosure includes a receiving module 1300 and a measuring module 1310.

The receiving module 1300 is configured to receive a CSI feedback configuration transmitted by a network side device to the user equipment, where one CSI feedback configuration corresponds to one CSI-RS resource, and for each port of the CSI-RS resource, the pilot signal corresponding to the port over one group of antenna elements corresponding to the port; and The measuring module 1310 is configured to receive a pilot signal over the CSI-RS resource corresponding to the CSI feedback configuration and to make signal measurement according to the received pilot signal.

Preferably the measuring module 1310 feeds back channel state information of all or a part of CSI feedback configurations.

Preferably if the channel state information of a part of the CSI feedback configurations is fed back, then the measuring module 1310 feeds identification information of the CSI feedback configurations corresponding to the fed-back channel state information back to the network side device.

Preferably the measuring module 1310 feeds back the channel state information of L CSI feedback configurations corresponding to the highest CQIs or RIs; or feeds back the channel state information of L CSI feedback configurations with the highest throughputs to which the CQIs corresponding to the CSI feedback configurations are mapped.

Preferably the CSI-RS resource corresponding to the CSI feedback configuration is selected by the network side device from second CSI-RS resources corresponding to all of first CSI-RS resources; and the measuring module 1310 receives a first CSI feedback configuration transmitted by the network side device to the user equipment; and receives a pilot signal over a CSI-RS resource corresponding to the first CSI feedback configuration and makes signal measurement according to the received pilot signal.

Preferably the measuring module 1310 measures RSRP according to the received pilot signal.

The measuring module 1310 determines the RSRP over the first CSI-RS resource corresponding to each of first CSI feedback configurations and feeds the determined RSRP back to the network side device.

Preferably the measuring module 1310 determines the RSRP of all or a part of the ports of the first CSI-RS resources corresponding to all or a part of the first CSI feedback configurations and averages the determined RSRP.

Preferably the measuring module 1310 averages the determined RSRP in a preset time range and/or in a preset frequency range.

Preferably the measuring module 1310 feeds the determined RSRP periodically back to the network side device; or feeds the determined RSRP back to the network side device after a feedback event is issued.

Based upon the same inventive idea, an embodiment of the disclosure further provides a method for transmitting a pilot signal, and since a device corresponding to this method is the network side device in the system for signal measurement according to the embodiment of the disclosure, and this method addresses the problem under a similar principle to the network side device, reference can be made to the implementation of the UE for an implementation of the network side device, so a repeated description thereof will be omitted here.

Figure 14:
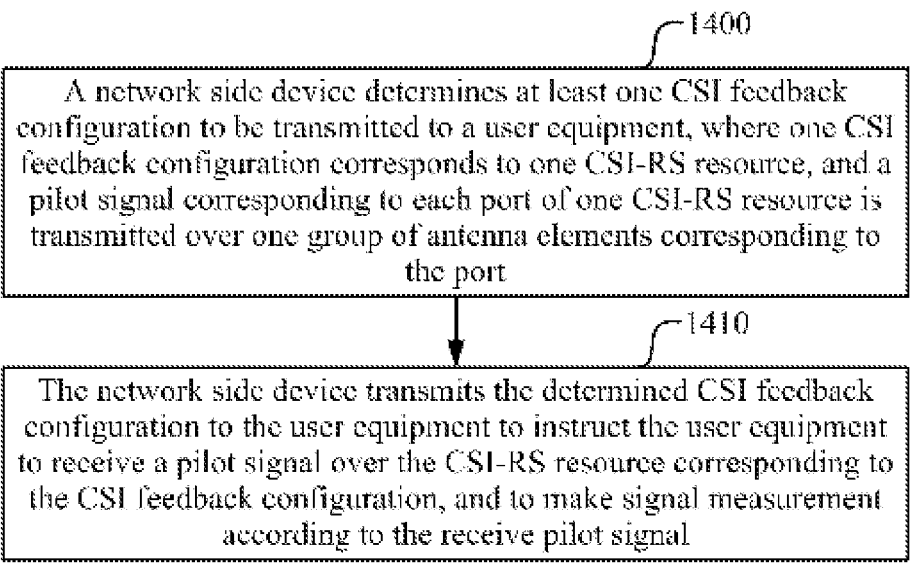
FIG. 14 illustrates a schematic flow chart of a method for transmitting a pilot signal according to an embodiment of the disclosure.

As illustrated in FIG. 14, a method for transmitting a pilot signal according to an embodiment of the disclosure includes the following operations:

In the operation 1400, a network side device determines at least one CSI feedback configuration to be transmitted to a user equipment, where one CSI feedback configuration corresponds to one CSI-RS resource, and for each port of the CSI-RS resource, the pilot signal corresponding to the port over one group of antenna elements corresponding to the port, and In the operation 1410, the network side device transmits the determined CSI feedback configuration to the user equipment to instruct the user equipment to receive a pilot signal over the CSI-RS resource corresponding to the CSI feedback configuration, and to make signal measurement according to the receive pilot signal.

In an implementation, the network side device according to the embodiment of the disclosure groups a plurality of antenna elements of the network side device into K groups, each of which includes at least one antenna element.

The numbers of antenna elements in the respective groups may be the same, partially the same or totally different.

For example, for a horizontally and vertically 2D-arranged array of antennas, each column of antenna elements can be grouped together (particularly see FIG. 5) or each column of antenna elements can be grouped together (particularly see FIG. 6).

Figure 7:
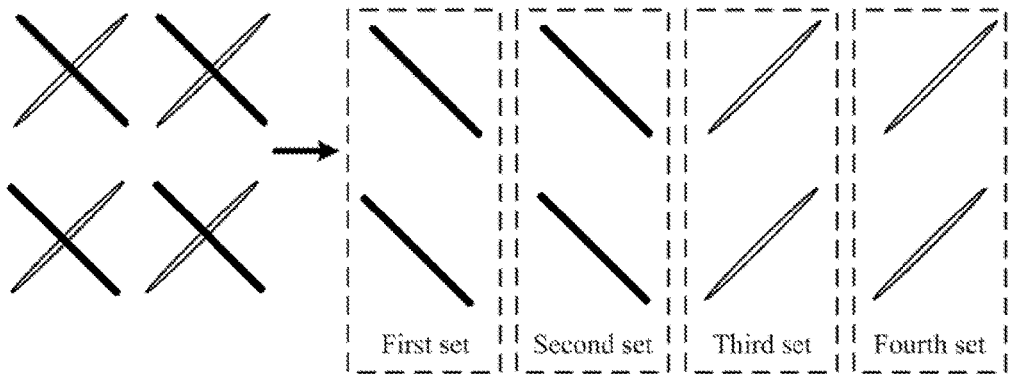
FIG. 7 illustrates a schematic diagram of antenna elements grouped per polarization direction according to an embodiment of the disclosure.

For horizontally and vertically 2D-arranged dually-polarized antennas, antennas polarized in the same direction in a column of antenna elements can be grouped together, that is, a column of antenna elements can be grouped into two groups (particularly see FIG. 7).

Signal measurement can be made in two approaches according to the embodiment, which will be described below respectively.

In a first approach, M CSI-RS resources are determined directly from N CSI-RS resources and transmitted to the user equipment The CSI-RS resource corresponding to the CSI feedback configuration determined by the network side device is selected from the N CSI-RS resources.

Preferably the network side device determines the M CSI feedback configurations, where M represents a positive integer, and M is no more than N.

Interference measurement resources of the CSI feedback configurations corresponding to the M CSI-RS resources are the same.

For one CSI-RS resource, the network side device transmits the pilot signal corresponding to each port of the CSI-RS resource over one group of antenna elements corresponding to the port of the CSI-RS resource.

For one CSI-RS resource, the network side device determines an intra-group beam-forming weight vector corresponding to the CSI-RS resource; and for one port, the network side device weights the pilot signal corresponding to the port of the CSI-RS resource by the determined intra-group beam-forming weight vector and then transmits the pilot signal over one group of antenna elements corresponding to the port.

The intra-group beam-forming weight vectors corresponding to the respective CSI-RS resources are totally different or partially the same.

In an implementation, the network side device can transmit the pilot signal corresponding to each port of the CSI-RS resource periodically, and transmit the CSI feedback configuration corresponding to the CSI-RS resource to the user equipment if necessary; or can firstly transmit the CSI feedback configuration corresponding to the CSI-RS resource to the user equipment and then transmit the pilot signal corresponding to each port of the CSI-RS resource periodically. That is, the CSI feedback configuration corresponding to the CSI-RS resource may not necessarily be transmitted to the user equipment before or after the pilot signal is transmitted thereto.

In the following description, the numbers of antenna elements in the respective groups will be the same by way of an example, but the same process will apply to the numbers of antenna elements which are different or partially the same, so a repeated description thereof will be omitted here.

In the first approach, the network side device determines the N CSI-RS resources (or other pilot signals), each of which includes several specific time-frequency elements over which pilot signals of some number of antenna ports are transmitted.

The time-frequency elements of the CSI-RS resources can be determined by a sub-frame periodicity, a sub-frame offset, time-frequency locations occupied in a sub-frame and other parameters. For details about determination of time-frequency elements of a CSI-RS resource, reference can be made to the 3GPP TS 36.211 v10.5.0, so a repeated description thereof will be omitted here.

The number of ports of each of the CSI-RS resources is the same as the number of groups of antenna elements, and one port of each of the CSI-RS resources corresponds to one group of antenna elements, for example, the first port corresponds to the first group of antenna elements, the second port corresponds to the second group of antenna elements, and so on. The N CSI-RS resources can be configured with different sub-frame periodicities and offsets or configured with the same sub-frame periodicity and offset but at different locations in one sub-frame.

The network side device determines one intra-group beam-forming weight vector for each of the CSI-RS resources (respective elements of the vector are intra-group beam-forming weight values).

In an implementation, a correspondence relationship between the CSI-RS resource and the beam-forming weight vector can be pre-created, and the intra-group beam-forming weight vector corresponding to each of the CSI-RS resources can be determined according to the correspondence relationship. For example, if several beam need to be generated to cover the entire cell vertically, then each of the beams can correspond to one CSI-RS resource. Here the correspondence relationship can be preset for required coverage, simulation, etc., and can be preset in a protocol or signaled by a higher layer or decided by the network side device alone without notifying the user equipment.

For each port of the CSI-RS resource, the pilot signal thereof is weighted by the intra-group beam-forming weight vector and then transmitted over one group of antenna elements corresponding to the port.

The network side device notifies the user equipment of the M CSI feedback configurations, each of which corresponds to one CSI-RS resource, i.e., one of the N CSI-RS resources, that is, M≤N.

Optionally each CSI feedback configuration corresponds to one interference measurement resource, and preferably the interference measurement resources of the M CSI feedback configurations are the same. The user equipment measures interference over the interference measurement resources.

In an implementation, the user equipment feeds back channel state information of all or a part of the CSI feedback configurations.

The user equipment estimates a channel, and calculates the channel state information, which can include but will not be limited to a part or all of an RI, a PMI and a CQI, of each of the CSI feedback configurations, over the CSI-RS resource (and the interference measurement resource) corresponding to each of the CSI feedback configurations, and feeds it back as configured by the network side device:

1. The user equipment feeds the channel state information of all the CSI feedback configurations back to the network side device; and 2. The user equipment selects according to some criterion and feeds back the channel state information of a part of the CSI feedback configurations. For example, the user equipment selects the CSI feedback configuration with the highest CQI for feedback or selects the CSI feedback configuration with the highest RI for feedback or selects the CSI feedback configuration with the highest throughput, to which the CQI is mapped, for feedback.

Preferably if the user equipment selects a part of the CSI feedback configurations for feedback, then the user equipment can feed identification information, of the CSI feedback configurations for feedback, back to the network side device.

The network side device selects at least one of the at least one CSI feedback configuration transmitted to the user equipment according to a measurement parameter fed back by the user equipment and determines a parameter of data transmission with the user equipment according to the selected CSI feedback configuration.

Preferably the network side device selects the CSI feedback configuration corresponding to the highest CQI or the CSI feedback configuration with the highest throughput to which the CQI corresponding to the CSI feedback configuration is mapped.

In an implementation, in order to support multi-user transmission, the network side device can select the CSI feedback configuration for the user equipment by taking into account the CSI information of a plurality of paired user equipments, that is, select the CSI to be applied to data transmission for the paired user equipments together. That is, the network side device selects one CSI feedback configuration respectively for each of the paired user equipments to thereby maximum the sum of weighted throughputs of the paired user equipments.

In an implementation, the network side device determines a parameter of data transmission with the user equipment according to a measurement parameter fed back by the user equipment.

The network side device selects at least one of the at least one CSI feedback configuration transmitted to the user equipment according to the measurement parameter fed back by the user equipment and determines the parameter of data transmission with the user equipment according to the selected CSI feedback configuration.

The network side device determines the parameter of data transmission with the user equipment according to the intra-group beam-forming weight vector and a pre-coding matrix, wherein the intra-group beam-forming weight vector is corresponding to the CSI-RS resource corresponding to the selected CSI feedback configuration, and the pre-coding matrix is corresponding to a Pre-coding Matrix Indicator, PMI, fed back by the user equipment, corresponding to the selected CSI feedback configuration.

In an implementation, the network side device determines a transmission matrix $Z=V \otimes W$ or $Z=W \otimes V$, where $W=[w(0)\ w(1)\ \ldots\ w(P-1)]^T$ represents the intra-group beam-forming weight vector, and V represents the pre-coding matrix corresponding to the PMI, fed back by the user equipment, corresponding to the selected CSI feedback configuration and includes the r-th column $v_r=[v(0,r), v(1,r), \ldots, v(K-1,r)]^T$; and determines a weight coefficient matrix according to the transmission matrix.

With the transmission matrix of $Z=V \otimes W$, the network side device determines a weight coefficient of the r-th data stream on the h-th antenna element in the i-th group of antennas as $z(P \cdot 1 + h, r)$; or With the transmission matrix of $Z=W \otimes V$, the network side device determines a weight coefficient of the r-th data stream on the h-th antenna element in the i-th group of antennas as $z(i + h \cdot K, r)$.

The weight coefficient matrix can be determined according to the transmission matrix in the following two approaches:

In a first approach, the network side device determines the weight coefficient matrix as the transmission matrix.

In a second transmission approach, the network side device zero-forces the transmission matrix and determines the weight coefficient matrix as the zero-forced transmission matrix.

In a second approach, the CSI-RS resource is selected for the user equipment according to a measurement parameter fed back by the user equipment.

Firstly the network side device transmits a first CSI feedback configuration corresponding to a first CSI-RS resource to the user equipment to instruct the user equipment to receive a pilot signal over the first CSI-RS resource corresponding to the first CSI feedback configuration and to make signal measurement according to the received pilot signal.

For one first CSI-RS resource, the network side device transmits a pilot signal corresponding to each port of the first CSI-RS resource over one group of antenna elements corresponding to the port of the first CSI-RS resource.

For one first CSI-RS resource, the network side device determines an intra-group beam-forming weight vector corresponding to the first CSI-RS resource; and for one port, the network side device weights the pilot signal corresponding to the port of the first CSI-RS resource by the determined intra-group beam-forming weight vector and then transmits the pilot signal over one group of antenna elements corresponding to the port.

In an implementation, the network side device can transmit the pilot signal corresponding to each port of the first CSI-RS resource periodically, and transmit the first CSI feedback configuration corresponding to the first CSI-RS resource to the user equipment if necessary; or can firstly transmit the first CSI feedback configuration corresponding to the first CSI-RS resource to the user equipment and then transmit the pilot signal corresponding to each port of the first CSI-RS resource periodically. That is, the first CSI feedback configuration corresponding to the first CSI-RS resource may not necessarily be transmitted to the user equipment before or after the pilot signal is transmitted thereto.

Then the network side device determines a measurement parameter of the user equipment for the pilot signal of at least one first CSI-RS resource; selects a part or all of first CSI-RS resources from all the first CSI-RS resources according to the determined measurement parameters; and determines a second CSI feedback configuration of at least one second CSI-RS resource corresponding to the selected a part or all of first CSI-RS resources as the CSI feedback configuration to be transmitted to the user equipment.

Preferably the intra-group beam-forming weight vector of the first CSI-RS resource is the same as an intra-group beam-forming weight vector of the corresponding second CSI-RS resource.

Preferably the network side device determines the first CSI-RS resources corresponding to the first X highest measurement parameters or determines the first CSI-RS resources corresponding to X measurement parameters greater than a threshold, where X represents a positive integer.

For one second CSI-RS resource, the network side device transmits a pilot signal corresponding to each port of the second CSI-RS resource over one group of antenna elements corresponding to the port of the second CSI-RS resource.

For one second CSI-RS resource, the network side device determines an intra-group beam-forming weight vector corresponding to the second CSI-RS resource; and for one port, the network side device weights the pilot signal corresponding to the port of the second CSI-RS resource by the determined intra-group beam-forming weight vector and then transmits the pilot signal over one group of antenna elements corresponding to the port.

In an implementation, the network side device can transmit the pilot signal corresponding to each port of the second CSI-RS resource periodically, and transmit the second CSI feedback configuration corresponding to the second CSI-RS resource to the user equipment if necessary; or can firstly transmit the second CSI feedback configuration corresponding to the second CSI-RS resource to the user equipment and then transmit the pilot signal corresponding to each port of the second CSI-RS resource periodically. That is, the second CSI feedback configuration corresponding to the second CSI-RS resource may not necessarily be transmitted to the user equipment before or after the pilot signal is transmitted thereto.

In an implementation, the network side device can concurrently transmit the pilot signal corresponding to each port of the first CSI-RS resource periodically and transmit the pilot signal corresponding to each port of the second CSI-RS resource periodically; or can firstly transmit the pilot signal corresponding to each port of the first CSI-RS resource periodically and then transmit the pilot signal corresponding to each port of the second CSI-RS resource periodically.

In the following description, the numbers of antenna elements in the respective groups will be the same by way of an example, but the same process will apply to the numbers of antenna elements which are different or partially the same, so a repeated description thereof will be omitted here.

In the second approach, the network side device determines N first CSI-RS resources (or other pilot signals), each of which includes several specific time-frequency elements over which pilot signals of some number of antenna ports are transmitted.

The time-frequency elements of the first CSI-RS resources can be determined by a sub-frame periodicity, a sub-frame offset, time-frequency locations occupied in a sub-frame and other parameters. For details about determination of time-frequency elements of a first CSI-RS resource, reference can be made to the 3GPP TS 36.211 v10.5.0, so a repeated description thereof will be omitted here.

The number of ports of each of the first CSI-RS resources may be less than or the same as the number of groups of antenna elements, and one port of each of the first CSI-RS resources corresponds to one group of antenna elements, for example, the first port corresponds to the first group of antenna elements, the second port corresponds to the second group of antenna elements, and so on. The N first CSI-RS resources can be configured with different sub-frame periodicities and offsets or configured with the same sub-frame periodicity and offset but at different locations in one sub-frame.

Preferably in order to lower an overhead of a pilot signal, the first CSI-RS resource can be configured with only one port, and a pilot signal of the port can be transmitted over one group of antenna elements.

An intra-group beam-forming weight vector is determined for each of the first CSI-RS resources (respective elements of the vector are intra-group beam-forming weight values), and for each port of the first CSI-RS resource, the pilot signal thereof is weighted by the intra-group beam-forming weight vector and then transmitted over one group of antenna elements corresponding to the port.

Preferably the intra-group beam-forming weight vectors of the N first CSI-RS resources are different from each other so that the entire cell can be covered by the N first CSI-RS resources, that is, the strength of the signal, over at least one of the first CSI-RS resources, received by the UE at any location in the cell is satisfactory.

The network side device notifies the user equipment of configuration information of the N first CSI-RS resources, including a periodicity, an offset, time-frequency locations in a sub-frame, transmit power, the number of antenna ports and other configuration information.

In an implementation, the user equipment estimates a channel, and calculates pilot signal received power, according to the configuration information of each of the first CSI-RS resources and feeds it back as configured by the network side device.

The user equipment receives the first CSI feedback configuration transmitted by the network side device to the user equipment; and The user equipment receives the pilot signal over the CSI-RS resource corresponding to the first CSI feedback configuration and makes signal measurement according to the received pilot signal.

In an implementation, the user equipment measures RSRP according to the received pilot signal.

The user equipment determines the RSRP over the first CSI-RS resource corresponding to each of the first CSI feedback configurations and feeds the determined RSRP back to the network side device.

The user equipment determines the RSRP of all or a part of the ports of the first CSI-RS resources corresponding to all or a part of the first CSI feedback configurations and averages the determined RSRP.

For example, the user equipment estimates channels of all the ports of each of the first CSI-RS resources and averages pilot signal received power values of all the ports, or The user equipment estimates channels of only a part of the ports of each of the first CSI-RS resources and averages pilot signal received power values of these ports, for example, the user equipment estimates a channel of only the first port of each of the first CSI-RS resources and calculates a pilot signal received power value of the pilot signal.

In an implementation, the user equipment can further average the determined RSRP in a preset time range and/or in a preset frequency range.

Preferably the user equipment can feed the determined RSRP periodically back to the network side device; or feed the determined RSRP back to the network side device after a feedback event is issued.

For example, the user equipment can trigger the feedback upon determining that the RSRP of one of the first CSI-RS resources is more than some threshold.

The network side device receives the RSRP of the first CSI feedback configurations fed back by the user equipment and selects a beam.

The network side device selects M CSI feedback configuration, for example, with the highest RSRP among all the first CSI feedback configurations, where M represents a preset value; or selects first CSI feedback configurations with the RSRP more than some threshold, where the number of pieces of RSRP more than the threshold is M.

The network side device determines M second CSI-RS resources (or other pilot signals) corresponding to the M first CSI-RS resources.

Each of the second CSI-RS resources corresponds to one of the first CSI-RS resources. The second CSI-RS resource may be the same as some one of the first CSI-RS resources or may be different from any one of the first CSI-RS resources, so the first CSI-RS resources corresponding to the second CSI-RS resources can be preset as needed or through simulation and specified in a protocol or signaled by a higher layer or decided by the network side device alone without notifying to the user equipment.

Each of the second CSI-RS resources includes several specific time-frequency elements over which pilot signals of some number of antenna ports are transmitted. The time-frequency elements of the second CSI-RS resources can be determined by a sub-frame periodicity, a sub-frame offset, time-frequency locations occupied in a sub-frame and other parameters.

The number of ports of each of the second CSI-RS resources is the same as the number of groups of antenna elements, and one port of each of the second CSI-RS resources corresponds to one group of antenna elements, for example, the first port corresponds to the first group of antenna elements, the second port corresponds to the second group of antenna elements, and so on. The M second CSI-RS resources can be configured with different sub-frame periodicities and offsets or configured with the same sub-frame periodicity and offset but at different locations in one sub-frame.

An intra-group beam-forming weight vector is determined for each of the second CSI-RS resources (respective elements of the vector are intra-group beam-forming weight values), and for each port of the second CSI-RS resource, the pilot signal thereof is weighted by the intra-group beam-forming weight vector and then transmitted over one group of antenna elements corresponding to the port in the same process as the process in FIG. 8.

The intra-group beam-forming weight vector of each of the second CSI-RS resources is derived from the intra-group beam-forming weight vector of the corresponding first CSI-RS resource, for example, determined directly as the intra-group beam-forming weight vector of the corresponding first CSI-RS resource.

The network side device notifies the user equipment of configuration information of the M second CSI-RS resources, including a periodicity, an offset, time-frequency locations in a sub-frame, transmit power, the number of antenna ports and other configuration information.

Based upon the same inventive idea, an embodiment of the disclosure further provides a method for signal measurement, and since a device corresponding to this method is the user equipment in the system for signal measurement according to the embodiment of the disclosure, and this method addresses the problem under a similar principle to the user equipment, reference can be made to the implementation of the UE for an implementation of the user equipment, so a repeated description thereof will be omitted here.

Figure 15:
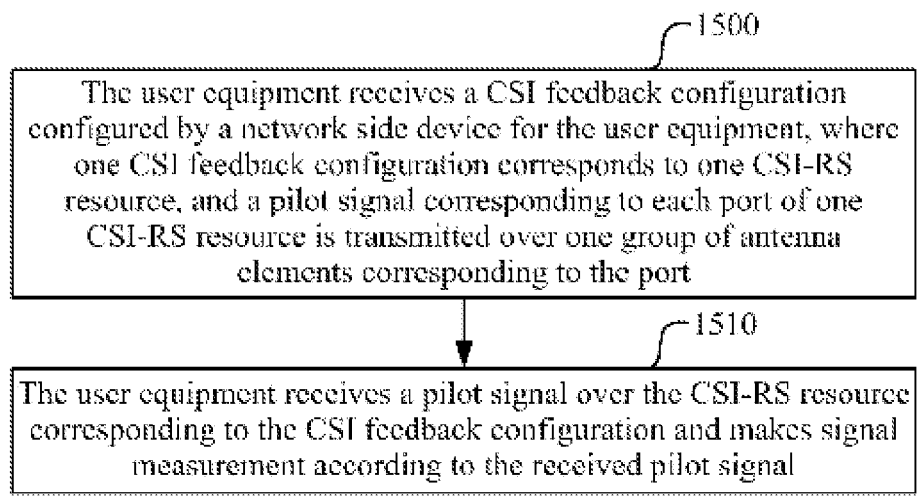
FIG. 15 illustrates a schematic flow chart of a method for signal measurement by a user equipment according to an embodiment of the disclosure.

As illustrated in FIG. 15, a method for signal measurement by a user equipment according to an embodiment of the disclosure includes the following operations:

In the operation 1500, the user equipment receives a CSI feedback configuration transmitted by a network side device to the user equipment, where one CSI feedback configuration corresponds to one CSI-RS resource, and for each port of the CSI-RS resource, the pilot signal corresponding to the port over one group of antenna elements corresponding to the port; and In the operation 1510, the user equipment receives a pilot signal over the CSI-RS resource corresponding to the CSI feedback configuration and makes signal measurement according to the received pilot signal.

Preferably the user equipment feeds back channel state information of all or a part of CSI feedback configurations.

Preferably if the user equipment feeds back the channel state information of a part of the CSI feedback configurations, then the user equipment feeds identification information of the CSI feedback configurations corresponding to the fed-back channel state information back to the network side device.

Preferably the user equipment feeds back the channel state information of a part of the CSI feedback configurations includes:

The user equipment feeds back the channel state information of L CSI feedback configurations corresponding to the highest CQIs or RIs; or The user equipment feeds back the channel state information of L CSI feedback configurations with the highest throughputs to which the CQIs corresponding to the CSI feedback configurations are mapped.

Preferably if the CSI-RS resource corresponding to the CSI feedback configuration is selected by the network side device from second CSI-RS resources corresponding to all of first CSI-RS resources, then:

Before the user equipment receives the CSI feedback configuration transmitted by the network side device to the user equipment, the method further includes:

The user equipment receives a first CSI feedback configuration transmitted by the network side device to the user equipment; and The user equipment receives a pilot signal over a CSI-RS resource corresponding to the first CSI feedback configuration and makes signal measurement according to the received pilot signal.

Preferably after the user equipment receives the pilot signal over the CSI-RS resource corresponding to the first CSI feedback configuration and makes signal measurement according to the received pilot signal, and before the user equipment receives the CSI feedback configuration transmitted by the network side device to the user equipment, the method further includes:

The user equipment determines Pilot signal Received Power (RSRP) over the first CSI-RS resource corresponding to each of first CSI feedback configurations and feeds the determined RSRP back to the network side device.

Preferably the user equipment determines the RSRP includes:

The user equipment determines the RSRP of all or a part of the ports of the first CSI-RS resources corresponding to all or a part of the first CSI feedback configurations and averages the determined RSRP.

Preferably the user equipment average the determined RSRP includes:

The user equipment average the determined RSRP in a preset time range and/or in a preset frequency range.

Preferably the user equipment feeds the determined RSRP periodically back to the network side device; or feeds the determined RSRP back to the network side device after a feedback event is issued.

Figure 16:
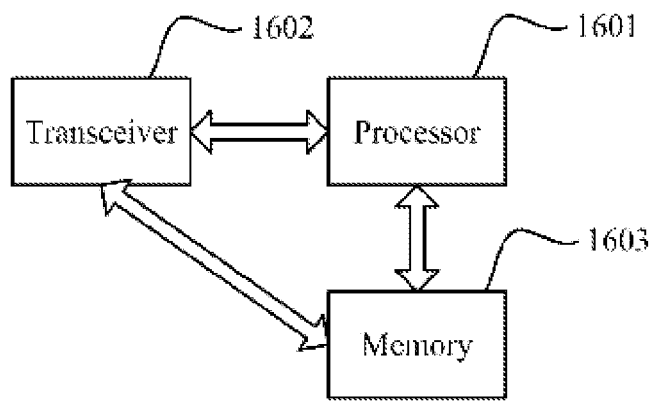
FIG. 16 illustrates a schematic structural diagram of a network side device according to another embodiment of the disclosure.

Based upon the same technical idea, an embodiment of the disclosure further provides a network side device. As illustrated in FIG. 16, the network side device includes a processor 1601 and a transceiver 1602 and can further include a memory 1603.

The processor 1601 is configured to determine at least one CSI feedback configuration to be transmitted to a user equipment, where one CSI feedback configuration corresponds to one CSI-RS resource, and for each port of the CSI-RS resource, the pilot signal corresponding to the port over one group of antenna elements corresponding to the port; and the transceiver 1602 is configured to transmit the determined CSI feedback configuration to the user equipment to instruct the user equipment to receive a pilot signal over the CSI-RS resource corresponding to the CSI feedback configuration and to make signal measurement according to the received pilot signal.

Preferably the CSI-RS resource corresponding to the CSI feedback configuration determined by the processor 1601 is selected from N CSI-RS resources, where N represents a positive integer.

Furthermore the processor 1601 is further configured to transmit, for one CSI-RS resource, the pilot signal corresponding to each port of the CSI-RS resource over one group of antenna elements corresponding to each port of the CSI-RS resource through the transceiver 1602.

The processor 1601 is configured to determine, for one CSI-RS resource, an intra-group beam-forming weight vector corresponding to the CSI-RS resource; and to weight, for each port of the CSI-RS resource, the pilot signal corresponding to the port of the CSI-RS resource by the determined intra-group beam-forming weight vector and then transmit the pilot signal over one group of antenna elements corresponding to the port.

The processor 1601 is configured to determine a measurement parameter of the user equipment for the pilot signal of at least one first CSI-RS resource; to select a part or all of first CSI-RS resources from all first CSI-RS resources according to the determined measurement parameters; to determines at least one second CSI-RS resource corresponding to the selected a part or all of first CSI-RS resources; and to determine a second CSI feedback configuration as the CSI feedback configuration to be transmitted to the user equipment, where a CSI-RS resource corresponding to the second CSI feedback configuration is the determined second CSI-RS resource.

The processor 1601 determines the first CSI-RS resources corresponding to the first X highest measurement parameters or determines the first CSI-RS resources corresponding to X measurement parameters greater than a threshold, where X represents a positive integer.

Furthermore the processor 1601 can configure the user equipment with the first CSI feedback configuration corresponding to the first CSI-RS resource through the transceiver to instruct the user equipment to receive a pilot signal over the first CSI-RS resource corresponding to the first CSI feedback configuration and to make signal measurement according to the received pilot signal.

Furthermore the processor 1601 can transmit, for one first CSI-RS resource, a pilot signal corresponding to each port of the first CSI-RS resource over one group of antenna elements corresponding to the port of the first CSI-RS resource through the transceiver.

Furthermore the processor 1601 can determine, for one first CSI-RS resource, an intra-group beam-forming weight vector corresponding to the first CSI-RS resource; and weight, for each port of the first CSI-RS resource, the pilot signal corresponding to the port of the first CSI-RS resource by the determined intra-group beam-forming weight vector and then transmit the pilot signal over one group of antenna elements corresponding to the port.

Furthermore the processor 1601 can transmit, for one second CSI-RS resource, a pilot signal corresponding to each port of the second CSI-RS resource over one group of antenna elements corresponding to the port of the second CSI-RS resource through the transceiver.

Furthermore the processor 1601 can determine, for one second CSI-RS resource, an intra-group beam-forming weight vector corresponding to the second CSI-RS resource; and the transceiver 1602 can weight, for each port of the second CSI-RS resource, the pilot signal corresponding to each port of the second CSI-RS resource by the determined intra-group beam-forming weight vector and then transmit the pilot signal over one group of antenna elements corresponding to the port.

Furthermore the processor 1601 can group a plurality of antenna elements into a plurality of groups, each of which includes at least one antenna element.

Furthermore the processor 1601 can group each column of antenna elements together; or group each row of antenna elements together; or group antenna elements polarized in the same direction in a column of antenna elements.

Furthermore the processor 1601 can determine a parameter of data transmission with the user equipment according to a measurement parameter fed back by the user equipment.

Furthermore the processor 1601 can select at least one of the at least one CSI feedback configuration transmitted to the user equipment according to the measurement parameter fed back by the user equipment and determine the parameter of data transmission according to CSI reported by the user equipment for the selected CSI feedback configuration.

The processor 1601 can select the CSI feedback configuration corresponding to the highest CQI or the CSI feedback configuration with the highest throughput to which the CQI corresponding to the CSI feedback configuration is mapped; or select one CSI feedback configuration respectively for each of paired user equipments to thereby maximum the sum of weighted throughputs of the paired user equipments.

The processor 1601 can determine the parameter of data transmission with the user equipment according to the intra-group beam-forming weight vector corresponding to the CSI-RS resource corresponding to the selected CSI feedback configuration, and a pre-coding matrix corresponding to a PMI, fed back by the user equipment, corresponding to the selected CSI feedback configuration.

The processor 1601 can determine a transmission matrix $Z=V \otimes W$ or $Z=W \otimes V$, where $W=[w(0)\ w(1)\ \ldots\ w(P-1)]^T$ represents the intra-group beam-forming weight vector, P represents the number of antenna elements in a group of antenna elements, and V represents the pre-coding matrix corresponding to the PMI, fed back by the user equipment, corresponding to the selected CSI feedback configuration and includes the r-th column $v_r=[v(0,r),\ v(1,r),\ \ldots,\ v(K-1,r)]^T$, where K represents the number of ports of the CSI-RS resource corresponding to the selected CSI feedback configuration; and determines a weight coefficient matrix according to the transmission matrix.

Figure 17:
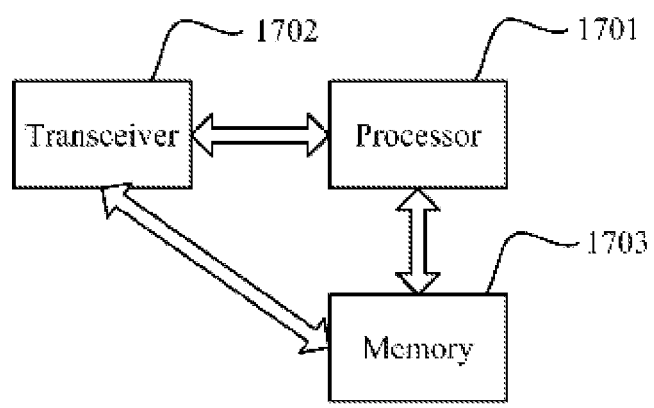
FIG. 17 illustrates a schematic structural diagram of a user equipment according to another embodiment of the disclosure.

Based upon the same inventive idea, an embodiment of the disclosure further provides a user equipment. As illustrated in FIG. 17, the user equipment can include a processor 1701 and a transceiver 1702 and can further include a memory 1703, where:

The transceiver 1702 is configured to receive a CSI feedback configuration configured by a network side device for the user equipment, where one CSI feedback configuration corresponds to one CSI-RS resource, and for each port of the CSI-RS resource, the pilot signal corresponding to the port over one group of antenna elements corresponding to the port; and the processor 1701 is configured to receive a pilot signal over the CSI-RS resource corresponding to the CSI feedback configuration and to make signal measurement according to the received pilot signal.

Furthermore the processor 1701 can feed back channel state information of all or a part of CSI feedback configurations through the transceiver.

Furthermore if the channel state information of a part of the CSI feedback configurations is fed back, then the processor 1701 can further feed identification information of the CSI feedback configurations corresponding to the fed-back channel state information back to the network side device through the transceiver.

Furthermore the processor 1701 can further feed back the channel state information of L CSI feedback configurations corresponding to the highest CQIs or RIs through the transceiver; or feed back the channel state information of L CSI feedback configurations with the highest throughputs to which the CQI corresponding to the CSI feedback configurations are mapped, through the transceiver, where L represents a positive integer.

Furthermore the CSI-RS resource corresponding to the CSI feedback configuration is selected by the network side device from second CSI-RS resources corresponding to all of first CSI-RS resources; and the processor 1701 can further receive through the transceiver a first CSI feedback configuration configured by the network side device for the user equipment; and receive a pilot signal over a CSI-RS resource corresponding to the first CSI feedback configuration and make signal measurement according to the received pilot signal.

Furthermore the processor 1701 can measure Pilot signal Received Power (RSRP) according to the received pilot signal.

Furthermore the processor 1701 can further determine the RSRP over the first CSI-RS resource corresponding to each of first CSI feedback configurations and feed the determined RSRP back to the network side device.

Furthermore the processor 1701 can determine the RSRP of all or a part of the ports of the first CSI-RS resources corresponding to all or a part of the first CSI feedback configurations and average the determined RSRP.

Furthermore the processor 1701 can average the determined RSRP in a preset time range and/or in a preset frequency range.

Furthermore the processor 1701 can feed the determined RSRP periodically back to the network side device through the transceiver; or feed the determined RSRP back to the network side device through the transceiver after a feedback event is issued.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The invention claimed is:

1. A method for transmitting a pilot signal, the method comprising:
   determining, by a network side device, at least one Channel State Information, CSI, feedback configuration to be transmitted to a user equipment, wherein one CSI feedback configuration corresponds to one Channel State Information-Reference Signal, CSI-RS, resource, and for each port of one CSI-RS resource, a pilot signal corresponding to the port is transmitted over one group of antenna elements corresponding to the port; and
   transmitting, by the network side device, the determined at least one CSI feedback configuration to the user equipment to instruct the user equipment to receive a pilot signal over a CSI-RS resource corresponding to the determined at least one CSI feedback configuration and to make signal measurement according to the received pilot signal;

receiving, by the network side device, a measurement parameter fed back by the user equipment; wherein the measurement parameter is obtained based upon the received pilot signal;

selecting, by the network side device, at least one of the determined at least one CSI feedback configuration transmitted to the user equipment according to the measurement parameter fed back by the user equipment;

determining a parameter of data transmission for the user equipment according to CSI reported by the user equipment for the selected at least one of the determined at least one CSI feedback configuration; and transmitting data using the determined parameter of data transmission.

2. The method of claim 1, wherein the CSI-RS resource corresponding to the at least one CSI feedback configuration determined by the network side device is selected from N CSI-RS resources, wherein N represents a positive integer.

3. The method of claim 2, wherein the method further comprises:

for one CSI-RS resource, transmitting, by the network side device, for each port of the CSI-RS resource, the pilot signal corresponding to the port over one group of antenna elements corresponding to the port of the CSI-RS resource.

4. The method of claim 3, wherein for one CSI-RS resource, transmitting, by the network side device, for each port of the CSI-RS resource, the pilot signal corresponding to the port over one group of antenna elements corresponding to the port of the CSI-RS resource comprises:

for one CSI-RS resource, determining, by the network side device, an intra-group beam-forming weight vector corresponding to the CSI-RS resource; and for each port of the CSI-RS resource, weighting, by the network side device, the pilot signal corresponding to the port of the CSI-RS resource by the determined intra-group beam-forming weight vector, and then transmitting the pilot signal over one group of antenna elements corresponding to the port.

5. The method of claim 1, wherein determining, by the network side device, the at least one CSI feedback configuration to be transmitted to the user equipment comprises:

determining, by the network side device, a measurement parameter of the user equipment for a pilot signal of at least one first CSI-RS resource;

selecting, by the network side device, a part or all of the at least one first CSI-RS resource according to the determined measurement parameter;

determining, by the network side device, at least one second CSI-RS resource corresponding to the selected part or all of the at least one first CSI-RS resources; and determining, by the network side device, a second CSI feedback configuration as the CSI feedback configuration to be transmitted to the user equipment, wherein a CSI-RS resource corresponding to the second CSI feedback configuration is the determined at least one second CSI-RS resource.

6. The method of claim 5, wherein the intra-group beam-forming weight vector of the at least one first CSI-RS resource is the same as an intra-group beam-forming weight vector of the corresponding at least one second CSI-RS resource.

7. The method of claim 5, wherein selecting, by the network side device, a part or all of the at least one first CSI-RS resource comprises:

determining, by the network side device, the at least one first CSI-RS resources corresponding to the first X highest measurement parameters or determining the at least one first CSI-RS resource corresponding to X measurement parameters greater than a threshold, wherein X represents a positive integer.

8. The method of claim 5, wherein before determining, by the network side device, the measurement parameter of the user equipment for the pilot signal of the first CSI-RS resource, the method further comprises:

configuring, by the network side device, the user equipment with a first CSI feedback configuration corresponding to the at least one first CSI-RS resource to instruct the user equipment to receive a pilot signal over the at least one first CSI-RS resource corresponding to the first CSI feedback configuration and to make signal measurement according to the received pilot signal.

9. The method of claim 5, wherein the method further comprises:

for one of the at least one first CSI-RS resource, transmitting, by the network side device, for each port of the at least one first CSI-RS resource, a pilot signal corresponding to the port over one group of antenna elements corresponding to the port of the at least one first CSI-RS resource.

10. The method of claim 9, wherein transmitting, by the network side device, for each port of the at least one first CSI-RS resource, a pilot signal corresponding to the port over one group of antenna elements corresponding to the port of the at least one first CSI-RS resource comprises:

for one of the at least one first CSI-RS resource, determining, by the network side device, an intra-group beam-forming weight vector corresponding to the at least one first CSI-RS resource; and for each port of the at least one first CSI-RS resource, weighting, by the network side device, the pilot signal corresponding to the port of the at least one first CSI-RS resource by the determined intra-group beam-forming weight vector and then transmitting the pilot signal over one group of antenna elements corresponding to the port.

11. The method of claim 5, wherein the method further comprises:

for one of the at least one second CSI-RS resource, transmitting, by the network side device, for each port of the at least one second CSI-RS resource, a pilot signal corresponding to the port over one group of antenna elements corresponding to the port of the at least one second CSI-RS resource.

12. The method of claim 11, wherein transmitting, by the network side device, the pilot signal corresponding to each port of the at least one second CSI-RS resource over one group of antenna elements corresponding to the port of the at least one second CSI-RS resource comprises:

for one of the at least one second CSI-RS resource, determining, by the network side device, an intra-group beam-forming weight vector corresponding to the at least one second CSI-RS resource; and for each port of the at least one second CSI-RS resource, weighting, by the network side device, the pilot signal corresponding to the port of the at least one second CSI-RS resource by the determined intra-group beam-forming weight vector and then transmitting the pilot signal over one group of antenna elements corresponding to the port.

13. The method of claim 1, wherein before determining, by the network side device, the at least one CSI feedback configuration to be configured for the user equipment, the method further comprises:
grouping, by the network side device, a plurality of antenna elements into a plurality of groups, each of which comprises at least one antenna element.

14. The method of claim 1, wherein determining, by the network side device, the parameter of data transmission with the user equipment comprises:
determining, by the network side device, the parameter of data transmission with the user equipment according to the intra-group beam-forming weight vector and a pre-coding matrix, wherein the intra-group beam-forming weight vector corresponds to a CSI-RS resource corresponding to the selected at least one of the determined at least one CSI feedback configuration, and the pre-coding matrix corresponds to a Pre-coding Matrix Indicator, PMI, fed back by the user equipment, corresponding to the selected at least one of the determined at least one CSI feedback configuration.

15. The method of claim 14, wherein determining, by the network side device, the parameter of data transmission with the user equipment according to the intra-group beam-forming weight vector corresponding to the CSI-RS resource corresponding to the selected at least one of the determined at least one CSI feedback configuration, and the pre-coding matrix corresponding to the PMI, fed back by the user equipment, corresponding to the selected at least one of the determined at least one CSI feedback configuration comprises:
determining, by the network side device, a transmission matrix $Z=V \otimes W$ or $Z=W \otimes V$, wherein $W=[w(0)\ w(1)\ \ldots\ w(P-1)]^T$ represents the intra-group beam-forming weight vector, P represents the number of antenna elements in a group of antenna elements, and V represents the pre-coding matrix corresponding to the PMI, fed back by the user equipment, corresponding to the selected at least one of the determined at least one CSI feedback configuration and comprises the r-th column $v_r=[v(0,r), v(1,r), \ldots, v(K-1,r)]^T$, wherein K represents the number of ports of the CSI-RS resource corresponding to the selected at least one of the determined at least one CSI feedback configuration; and
determining, by the network side device, a weight coefficient matrix according to the transmission matrix.

16. The method of claim 15, wherein determining, by the network side device, the weight coefficient matrix according to the transmission matrix comprises:
determining, by the network side device, the weight coefficient matrix as the transmission matrix; or
zero-forcing, by the network side device, the transmission matrix and determining the weight coefficient matrix as the zero-forced transmission matrix.

17. A method for signal measurement, comprising:
receiving, by a user equipment, at least one CSI feedback configuration transmitted by a network side device;
receiving, by the user equipment, a pilot signal over the CSI-RS resource corresponding to the at least one CSI feedback configuration and making signal measurement according to the received pilot signal; and
sending, by the user equipment, a measurement parameter to the network side device, wherein the network side device selects at least one of the at least one CSI feedback configuration transmitted to the user equipment, according to the measurement parameter sent by the user equipment, determines a parameter of data transmission for the user equipment according to CSI reported by the user equipment for the selected CSI feedback configuration, and transmits data using the determined parameter of data transmission, wherein one CSI feedback configuration corresponds to one CSI-RS resource, and for each port of one CSI-RS resource, a pilot signal corresponding to the port is transmitted over one group of antenna elements corresponding to the port, wherein the measurement parameter is obtained based upon the received pilot signal.

18. The method of claim 17, wherein after making, by the user equipment, the signal measurement, the method further comprises:
feeding, by the user equipment, back channel state information of all or a part of the at least one CSI feedback configuration.

19. The method of claim 18, wherein if the user equipment feeds back the channel state information of a part of the at least one CSI feedback configuration, then the user equipment feeds identification information of the at least one CSI feedback configuration corresponding to the fed-back channel state information back to the network side device.

20. The method of claim 17, wherein a CSI-RS resource corresponding to the at least one CSI feedback configuration is selected from second CSI-RS resources corresponding to all of first CSI-RS resources; and
before receiving, by the user equipment, the at least one CSI feedback configuration transmitted by the network side device to the user equipment, the method further comprises:
receiving, by the user equipment, a first CSI feedback configuration configured by the network side device for the user equipment; and
receiving, by the user equipment, a pilot signal over a CSI-RS resource corresponding to the first CSI feedback configuration and making signal measurement according to the received pilot signal.

21. The method of claim 20, wherein making, by the user equipment, the signal measurement according to the received pilot signal comprises:
measuring, by the user equipment, Reference Signal Received Power, RSRP, according to the received pilot signal.

22. The method of claim 21, wherein determining, by the user equipment, the RSRP comprises:
determining, by the user equipment, the RSRP of all or a part of the ports of the first CSI-RS resources corresponding to all or a part of the first CSI feedback configuration, and averaging the determined RSRP.

23. A network side device, comprising a processor and a transceiver:
the processor is configured to determine at least one CSI feedback configuration to be transmitted to a user equipment, wherein one CSI feedback configuration corresponds to one CSI-RS resource, and for each port of one CSI-RS resource, a pilot signal corresponding to the port is transmitted over one group of antenna elements corresponding to the port; and
the transceiver is configured to transmit the determined at least one CSI feedback configuration to the user equipment to instruct the user equipment to receive a pilot signal over a CSI-RS resource corresponding to the determined at least one CSI feedback configuration and to make signal measurement according to the received pilot signal, and to receive a measurement parameter fed back by the user equipment;

wherein the processor is further configured to:

select at least one of the determined at least one CSI feedback configuration transmitted to the user equipment according to the measurement parameter fed back by the user equipment; wherein the measurement parameter is obtained based upon the received pilot signal;

determine a parameter of data transmission with the user equipment according to CSI reported by the user equipment for the selected at least one of the determined at least one CSI feedback configuration; and wherein the transceiver is further configured to transmit data using the determined parameter of data transmission.

24. The network side device of claim 23, wherein the CSI-RS resource corresponding to the determined at least one CSI feedback configuration determined by the network side device is selected from N CSI-RS resources, wherein N represents a positive integer.

25. The network side device of claim 24, wherein the processor is further configured:

for one CSI-RS resource, to transmit, for each port of the CSI-RS resource, the pilot signal corresponding to the port over one group of antenna elements corresponding to the port of the CSI-RS resource, through the transceiver.

26. The network side device of claim 25, wherein the processor is configured to determine, for one CSI-RS resource, an intra-group beam-forming weight vector corresponding to the CSI-RS resource; and to weight, for each port of the CSI-RS resource, the pilot signal corresponding to the port of the CSI-RS resource by the determined intra-group beam-forming weight vector, and then transmit the pilot signal over one group of antenna elements corresponding to the port.

27. The network side device of claim 24, wherein the processor is configured to determine a measurement parameter of the user equipment for the pilot signal of at least one first CSI-RS resource; to select a part or all of the at least one first CSI-RS resource according to the determined measurement parameter; to determine at least one second CSI-RS resource corresponding to the selected the part or all of the at least one first CSI-RS resource; and to determine a second CSI feedback configuration as the CSI feedback configuration to be transmitted to the user equipment, wherein a CSI-RS resource corresponding to the second CSI feedback configuration is the determined at least one second CSI-RS resource.

28. The network side device of claim 27, wherein the processor is configured to determine the at least one first CSI-RS resource corresponding to the first X highest measurement parameters or to determine the at least one first CSI-RS resource corresponding to X measurement parameters greater than a threshold, wherein X represents a positive integer.

29. The network side device of claim 27, wherein the processor is further configured to configure the user equipment with the first CSI feedback configuration corresponding to the at least one first CSI-RS resource through the transceiver to instruct the user equipment to receive a pilot signal over the at least one first CSI-RS resource corresponding to the first CSI feedback configuration and to make signal measurement according to the received pilot signal.

30. The network side device of claim 27, wherein the processor is further configured, for one of the at least one first CSI-RS resource, to transmit, for each port of the at least one first CSI-RS resource, a pilot signal corresponding to the port over one group of antenna elements corresponding to the port of the at least one first CSI-RS resource through the transceiver.

31. The network side device of claim 30, wherein the processor is further configured to determine, for one of the at least one first CSI-RS resource, an intra-group beam-forming weight vector corresponding to the at least one first CSI-RS resource; and to weight, for each port of the at least one first CSI-RS resource, the pilot signal corresponding to the port of the at least one first CSI-RS resource by the determined intra-group beam-forming weight vector and then transmit the pilot signal over one group of antenna elements corresponding to the port through the transceiver.

32. The network side device of claim 27, wherein the processor is further configured, for one of the at least one second CSI-RS resource, to transmit, for each port of the at least one second CSI-RS resource, a pilot signal corresponding to the port over one group of antenna elements corresponding to the port of the at least one second CSI-RS resource through the transceiver.

33. The network side device of claim 32, wherein the transceiver is configured to determine, for one of the at least one second CSI-RS resource, an intra-group beam-forming weight vector corresponding to the at least one second CSI-RS resource; and the transceiver is configured to weight, for each port of the at least one second CSI-RS resource, the pilot signal corresponding to each port of the at least one second CSI-RS resource by the determined intra-group beam-forming weight vector and then transmit the pilot signal over one group of antenna elements corresponding to the port.

34. The network side device of claim 33, wherein the processor is further configured to group a plurality of antenna elements into a plurality of groups, each of which comprises at least one antenna element.

35. The network side device of claim 23, wherein the processor is further configured to determine the parameter of data transmission with the user equipment according to the intra-group beam-forming weight vector and a pre-coding matrix, wherein the intra-group beam-forming weight vector corresponds to a CSI-RS resource corresponding to the selected at least one of the determined at least one CSI feedback configuration, and the pre-coding matrix corresponds to a Pre-coding Matrix Indicator, PMI, fed back by the user equipment, corresponding to the selected at least one of the determined at least one CSI feedback configuration.

36. The network side device of claim 35, wherein the processor is further configured:

to determine a transmission matrix $Z=V \otimes W$ or $Z=W \otimes V$, wherein $W=[w(0)\ w(1)\ \ldots\ w(P-1)]^T$ represents the intra-group beam-forming weight vector, P represents the number of antenna elements in a group of antenna elements, and V represents the pre-coding matrix corresponding to the PMI, fed back by the user equipment, corresponding to the selected at least one of the determined at least one CSI feedback configuration and comprises the r-th column $v_r=[v(0,r),\ v(1,r),\ \ldots,\ v(k-1,r)]^T$, wherein K represents the number of ports of the CSI-RS resource corresponding to the selected at least one of the determined at least one CSI feedback configuration; and to determine a weight coefficient matrix according to the transmission matrix.

37. A method for transmitting a pilot signal, the method comprising:
- determining, by a network side device, at least one Channel State Information, CSI, feedback configuration to be transmitted to a user equipment, wherein one CSI feedback configuration corresponds to one Channel State Information-Reference Signal, CSI-RS, resource, and for each port of one CSI-RS resource, a pilot signal corresponding to the port is transmitted over one group of antenna elements corresponding to the port; and
- transmitting, by the network side device, the determined at least one CSI feedback configuration to the user equipment to instruct the user equipment to receive a pilot signal over a CSI-RS resource corresponding to the determined at least one CSI feedback configuration and to make signal measurement according to the received pilot signal;
- wherein determining, by the network side device, the at least one CSI feedback configuration to be transmitted to the user equipment comprises:
- determining, by the network side device, a measurement parameter of the user equipment for a pilot signal of at least one first CSI-RS resource;
- selecting, by the network side device, a part or all of the at least one first CSI-RS resource according to the determined measurement parameter;
- determining, by the network side device, at least one second CSI-RS resource corresponding to the selected part or all of the at least one first CSI-RS resources; and
- determining, by the network side device, a second CSI feedback configuration as the CSI feedback configuration to be transmitted to the user equipment, wherein a CSI-RS resource corresponding to the second CSI feedback configuration is the determined at least one second CSI-RS resource.

38. The method of claim 37, wherein the intra-group beam-forming weight vector of the at least one first CSI-RS resource is the same as an intra-group beam-forming weight vector of the corresponding at least one second CSI-RS resource.

39. The method of claim 37, wherein selecting, by the network side device, a part or all of the at least one first CSI-RS resource comprises:
- determining, by the network side device, the at least one first CSI-RS resources corresponding to the first X highest measurement parameters or determining the at least one first CSI-RS resource corresponding to X measurement parameters greater than a threshold, wherein X represents a positive integer.

40. The method of claim 37, wherein before determining, by the network side device, the measurement parameter of the user equipment for the pilot signal of the first CSI-RS resource, the method further comprises:
- configuring, by the network side device, the user equipment with a first CSI feedback configuration corresponding to the at least one first CSI-RS resource to instruct the user equipment to receive a pilot signal over the at least one first CSI-RS resource corresponding to the first CSI feedback configuration and to make signal measurement according to the received pilot signal.

41. The method of claim 37, wherein the method further comprises:
- for one of the at least one first CSI-RS resource, transmitting, by the network side device, for each port of the at least one first CSI-RS resource, a pilot signal corresponding to the port over one group of antenna elements corresponding to the port of the at least one first CSI-RS resource.

42. The method of claim 41, wherein transmitting, by the network side device, for each port of the at least one first CSI-RS resource, a pilot signal corresponding to the port over one group of antenna elements corresponding to the port of the at least one first CSI-RS resource comprises:
- for one of the at least one first CSI-RS resource, determining, by the network side device, an intra-group beam-forming weight vector corresponding to the at least one first CSI-RS resource; and
- for each port of the at least one first CSI-RS resource, weighting, by the network side device, the pilot signal corresponding to the port of the at least one first CSI-RS resource by the determined intra-group beam-forming weight vector and then transmitting the pilot signal over one group of antenna elements corresponding to the port.

43. The method of claim 37, wherein the method further comprises:
- for one of the at least one second CSI-RS resource, transmitting, by the network side device, for each port of the at least one second CSI-RS resource, a pilot signal corresponding to the port over one group of antenna elements corresponding to the port of the at least one second CSI-RS resource.

44. The method of claim 43, wherein transmitting, by the network side device, the pilot signal corresponding to each port of the at least one second CSI-RS resource over one group of antenna elements corresponding to the port of the at least one second CSI-RS resource comprises:
- for one of the at least one second CSI-RS resource, determining, by the network side device, an intra-group beam-forming weight vector corresponding to the at least one second CSI-RS resource; and
- for each port of the at least one second CSI-RS resource, weighting, by the network side device, the pilot signal corresponding to the port of the at least one second CSI-RS resource by the determined intra-group beam-forming weight vector and then transmitting the pilot signal over one group of antenna elements corresponding to the port.

* * * * *